United States Patent
Fujiseki et al.

(10) Patent No.: US 10,641,218 B2
(45) Date of Patent: May 5, 2020

(54) FUEL PUMP MODULE

(71) Applicant: DENSO CORPORATION, Kariya, Aichi-pref. (JP)

(72) Inventors: Takemasa Fujiseki, Kariya (JP); Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 8 days.

(21) Appl. No.: 16/178,844

(22) Filed: Nov. 2, 2018

(65) Prior Publication Data
US 2019/0136809 A1 May 9, 2019

(30) Foreign Application Priority Data

Nov. 6, 2017 (JP) ................................. 2017-213930
Sep. 19, 2018 (JP) ................................. 2018-174819

(51) Int. Cl.
*F02M 37/10* (2006.01)
*G05D 7/06* (2006.01)

(52) U.S. Cl.
CPC ........ *F02M 37/103* (2013.01); *F02M 37/106* (2013.01); *G05D 7/0676* (2013.01); *Y10T 403/32901* (2015.01)

(58) Field of Classification Search
CPC ..... Y10T 403/32581; Y10T 403/32893; Y10T 403/32901
See application file for complete search history.

(56) References Cited

U.S. PATENT DOCUMENTS

| | | | | |
|---|---|---|---|---|
| 2,724,163 A | * | 11/1955 | Davis | F16B 5/06 24/609 |
| 5,738,462 A | * | 4/1998 | Petersen | F16B 12/22 312/140.2 |
| 7,540,536 B2 | * | 6/2009 | Hall | B60R 22/24 280/801.1 |
| 2017/0248106 A1 | | 8/2017 | Niwa et al. | |
| 2017/0268470 A1 | | 9/2017 | Murakoshi et al. | |
| 2017/0276105 A1 | | 9/2017 | Kondo et al. | |
| 2017/0328318 A1 | | 11/2017 | Fukui et al. | |
| 2018/0274504 A1 | | 9/2018 | Hayashi | |

FOREIGN PATENT DOCUMENTS

JP 2015-232332 12/2015
WO 2018/092338 5/2018

* cited by examiner

*Primary Examiner* — Hung Q Nguyen
*Assistant Examiner* — Mark L. Greene
(74) *Attorney, Agent, or Firm* — Nixon & Vanderhye P.C.

(57) ABSTRACT

A displacement amount of an apex of a small diameter part of a coupling shaft portion, which is required to displace the apex of the small diameter part placed in an engaging hole section of a complex hole to a limit point, is defined as a limit displacement amount while the limit point is an intersection between the engaging hole section and an insertion hole section of the complex hole. A projection is formed at a stopper piece as a displacement-amount limiting portion that limits the displacement amount of the apex to an amount, which is equal to or smaller than the limit displacement amount, through contact of the projection against an inner wall surface of the complex hole, which is opposed to the projection.

5 Claims, 20 Drawing Sheets

FUEL PUMP MODULE

CROSS REFERENCE TO RELATED APPLICATION

This application is based on and incorporates herein by reference Japanese Patent Application No. 2017-213930 filed on Nov. 6, 2017 and Japanese Patent Application No. 2018-174819 filed on Sep. 19, 2018.

TECHNICAL FIELD

The present disclosure relates to a fuel pump module.

BACKGROUND

Previously, there is known a fuel pump module that is installed in an inside of a fuel tank. This type of fuel pump module includes: a flange, which forms a lid to be installed to an opening of the fuel tank: a base, which supports a fuel pump; and a coupler, which rotatably supports the base. The fuel pump module is inserted into the fuel tank while rotating the base relative to the coupler.

For example, in the fuel pump module disclosed in JP2016-89739A (corresponding to US2017/0248106A1), a base main body of a base and a coupler are coupled together by using a coupling shaft portion, a connection hole (serving as a complex hole) and a stopper piece. The coupling shaft portion includes: a shaft part (serving as a small diameter part), which extends from a base part of the coupling shaft portion; and a bulging portion (serving as a large diameter part), which is formed at a distal end of the shaft part. The connection hole includes an engaging hole section and an insertion hole section, which are continuously formed together. Although the shaft part can pass the engaging hole section, the bulging portion cannot pass the engaging hole section. Furthermore, the bulging portion can pass the insertion hole section. The stopper piece can limit a movable range of the shaft part, which is placed in a state where the shaft part is received in the engaging hole section, toward the insertion hole section.

According to the technique recited in JP2016-89739A, the stopper piece is resiliently deformable. At the time of coupling the base main body to the coupler, the stopper piece is bent in a plate thickness direction of the stopper piece, so that the bulging portion can pass through the insertion hole section. Here, in a case of integrally molding the stopper piece with resin, it is necessary to provide a gap having a width equal to or larger than a predetermined value on both sides of the stopper piece due to restrictions on a strength of a mold die.

At the time of inserting the fuel pump module into the fuel tank, when the shaft part, which is received in the engaging hole section, is displaced toward the insertion hole section and contacts a side surface of the stopper piece, the stopper piece receives a load from the shaft part in an opposite direction that is opposite from the shaft part. In a case where a relatively large load or a relatively large torsion load is applied at the time of inserting the fuel pump module into the fuel tank, the stopper piece, which has relatively low rigidity, may be largely deformed in the opposite direction, which is opposite from the shaft part. In such a case, the shaft part may be displaced from the engaging hole section to the insertion hole section side. Once the shaft part is displaced from the engaging hole section into the insertion hole section, the shaft part may possibly be caught (i.e., arrested) by an inner wall of the connection hole and thereby may not be returned into the engaging hole section even after removal of the applied load. This may result in failure of relative rotation between the base main body and the coupler, and thereby the fuel pump module may not be placed in the appropriate orientation at the inner bottom surface of the fuel tank.

SUMMARY

It is an objective of the present disclosure to provide a fuel pump module that can limit occurrence of failure of relative rotation between a coupler and a base caused by a load at a time of inserting the fuel pump module into a fuel tank.

A fuel pump module, which is configured to be installed in an inside of a fuel tank, includes a fuel pump, a base, a flange and a coupler. The fuel pump is configured to pump fuel stored in the inside of the fuel tank. The base is configured to be placed at a bottom part of the fuel tank and supports the fuel pump. The flange forms a lid to be installed to an opening of the fuel tank. The coupler is placed between the flange and the base and rotatably supports the base.

The base and the coupler are coupled together through engagement of a coupling shaft portion, which is formed at one of the base and the coupler, into a complex hole of a complex-hole forming body, which is formed at the other one of the base and the coupler.

The coupling shaft portion includes: a main body part; a small diameter part that projects from the main body part; and a large diameter part that is formed at an opposite side of the small diameter part, which is opposite from the main body part. An outer diameter of the large diameter part is larger than an outer diameter of the small diameter part. The complex hole includes: an insertion hole section that is passable for the large diameter part; and an engaging hole section that is communicated with the insertion hole section. The engaging hole section is passable for the small diameter part but is not passable for the large diameter part.

The complex-hole forming body includes a stopper piece. The stopper piece is in a form of tongue and extends from an edge part of the complex-hole forming body in a crossing direction that crosses a communicating direction, in which the insertion hole section and the engaging hole section are communicated with each other. A distal end part of the stopper piece is deformable in the insertion hole section. The stopper piece contacts the small diameter part and thereby limits a displacement amount of the small diameter part when the small diameter part is displaced from an initial state, in which the small diameter part is held in place in the engaging hole section, toward the insertion hole section.

In a view taken in an axial direction of the coupling shaft portion, in the initial state, an apex of the small diameter part is opposed to an inner wall of the engaging hole section on a distal end side where a distal end of the stopper piece is placed, and a displacement amount of the apex of the small diameter part, which is required to displace the apex of the small diameter part in the initial state to a limit point, is defined as a limit displacement amount. The limit point is a point of intersection where the engaging hole section and the insertion hole section intersect with each other on the distal end side where the distal end of the stopper piece is placed. In the fuel pump module of the present disclosure, at least one of the stopper piece and the complex hole has at least one displacement-amount limiting portion. The at least one displacement-amount limiting portion limits the displacement amount of the apex of the small diameter part to an amount, which is equal to or smaller than the limit displacement amount, through contact of the at least one displacement-amount limiting portion against an opposing surface, against which the at least one displacement-amount limiting portion is opposed, before occurrence of contact of any other part of the at least one of the stopper piece and the complex hole against the opposing surface when the stopper piece is deformed in an opposite direction that is opposite from the small diameter part by a contact load of the small diameter part applied to the stopper piece.

In the fuel pump module of the present disclosure, at least one of the stopper piece and the complex hole has the at least one displacement-amount limiting portion, and thereby it is possible to limit the displacement of the apex of the small diameter part beyond the limit point toward the insertion hole section. Thus, even in a case where the stopper piece is deformed through application of a relatively large load or a relatively large torsion load to the stopper piece at the time of inserting the fuel pump module into the fuel tank, the small diameter part is less likely displaced from the engaging hole section to the insertion hole section side to possible cause arresting of the small diameter part by the wall of the complex hole. Therefore, when the amount of the applied load is reduced, the small diameter part can be appropriately returned to the initial state. Thus, occurrence of the failure of relative rotation between the base and the coupler is limited, and thereby the fuel pump module can be placed in the appropriate orientation at the inner bottom surface of the fuel tank.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

Hereinafter, fuel pump modules of various embodiments will be described with reference to the accompanying drawings. In the following embodiments and a comparative example, substantially identical portions will be indicated by the same reference signs and will not be described redundantly.

First Embodiment

Figure 1:
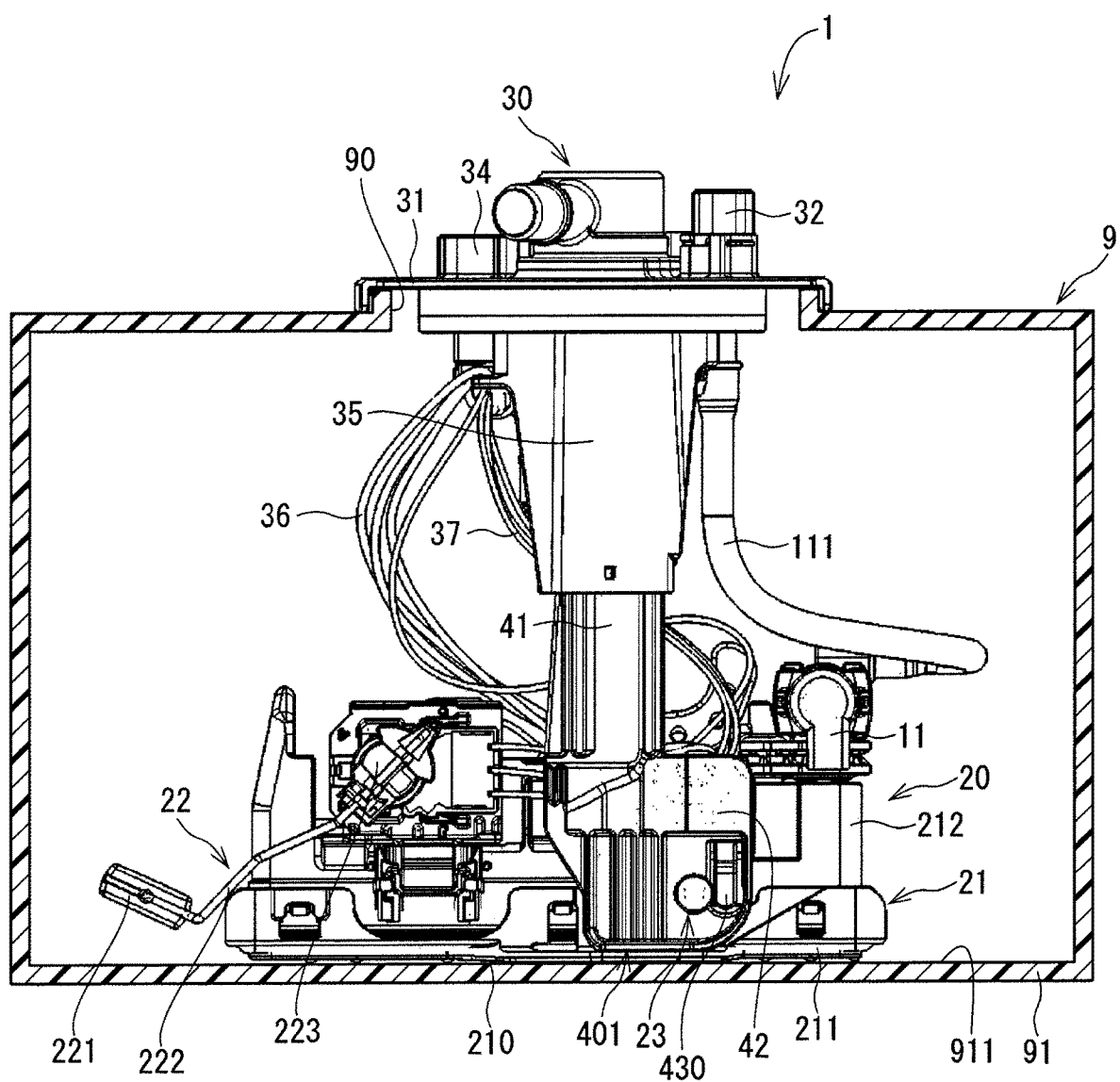
FIG. 1 is a schematic diagram of a fuel pump module according to a first embodiment.
Figure 2:
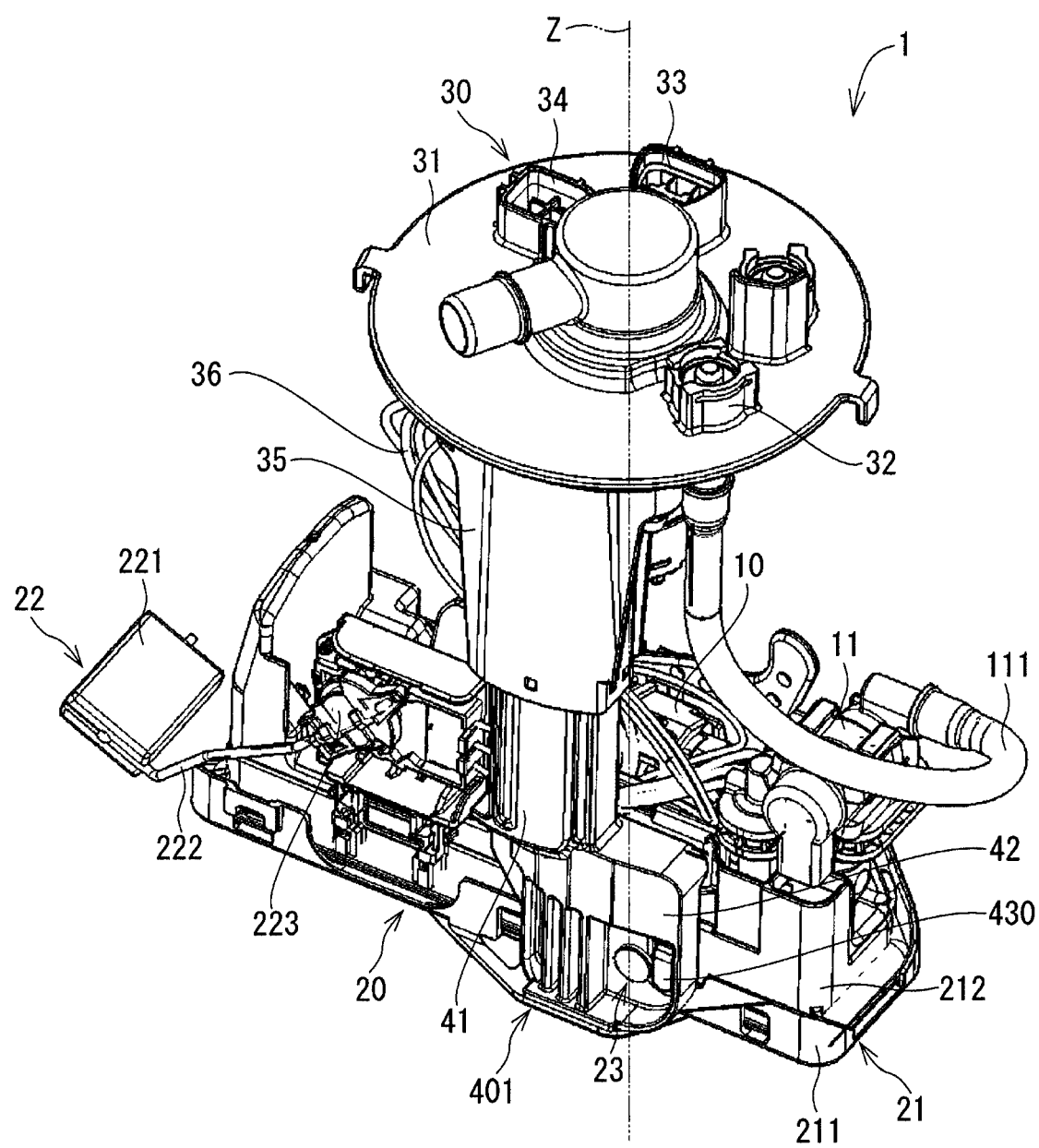
FIG. 2 is a perspective view of the fuel pump module according to the first embodiment.
Figure 3:
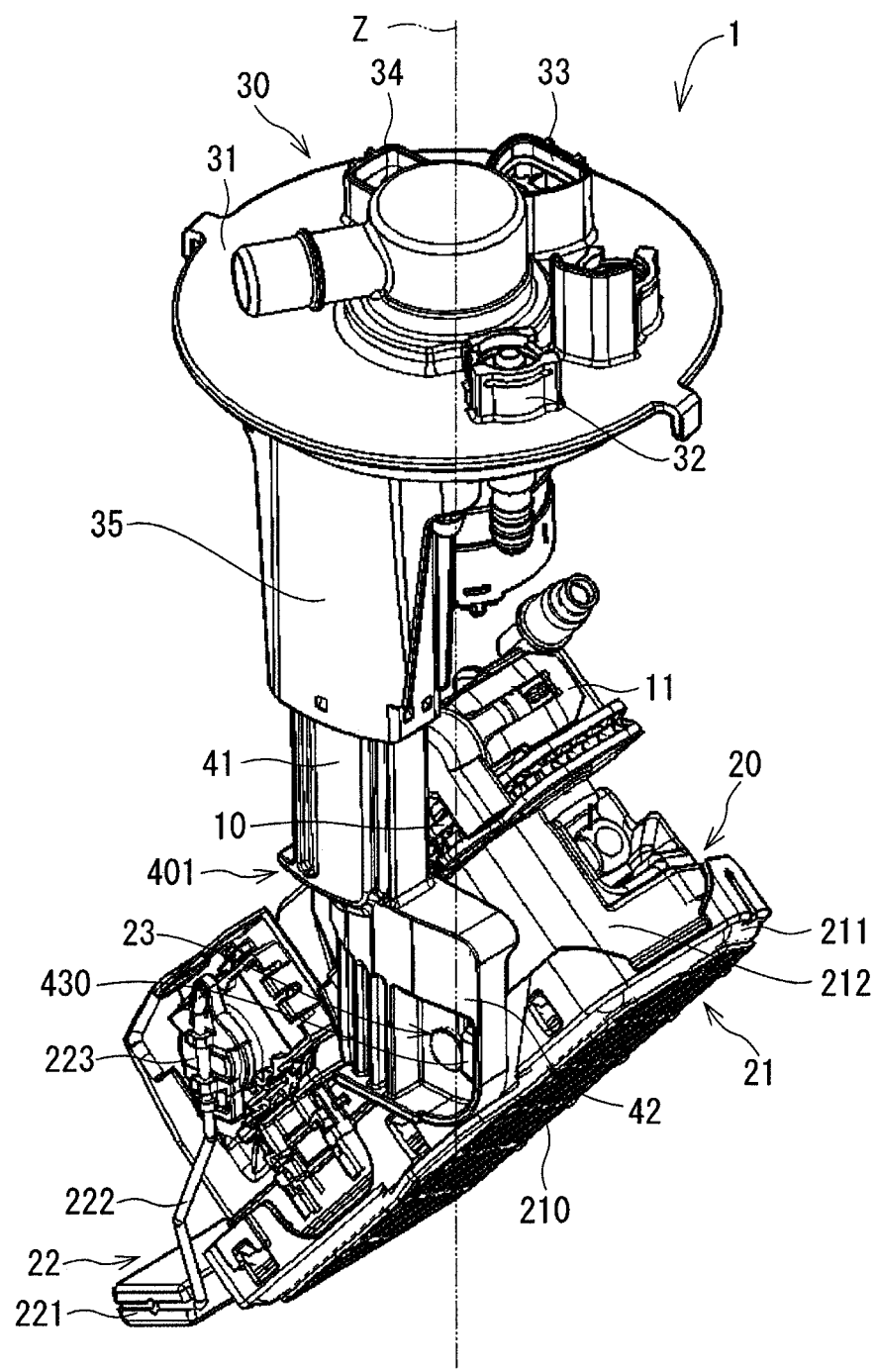
FIG. 3 is a perspective view of the fuel pump module of the first embodiment for describing a state at a time of inserting a fuel pump into an inside of a fuel tank.

FIGS. 1 to 3 show a fuel pump module according to a first embodiment. The fuel pump module 1 is installed to a fuel tank 9 mounted to, for example, a vehicle and pumps fuel stored in the fuel tank 9 toward an internal combustion engine. The fuel pump module 5 includes a fuel pump 10, a base 20, a flange 30 and a coupler 401. Hereinafter, in this and subsequent embodiments, the coupler is indicated by a corresponding three-digit number while the first and second digits of the number are "40", and the third digit of the number is a number of the corresponding embodiment.

The fuel pump 10 is supported by the base 20. The fuel pump 10 is driven by an electric power supplied from an outside through a wire harness 36 to suction the fuel in the inside of the fuel tank 9 and to pressurize the suctioned fuel. The pressurized fuel is delivered from the fuel pump 10 to a pressure regulating valve 11 that is installed to the base 20.

The pressure regulating valve 11 is installed to the base 20 at a location that is adjacent to the fuel pump 10. The pressure regulating valve 11 adjusts the pressure of the fuel discharged from the fuel pump 10 to a desired pressure. The fuel, the pressure of which is adjusted by the pressure regulating valve 11, is fed to the outside of the fuel tank 9 through a supply pipe 111 and the flange 30.

The base 20 is configured such that the base 20 contacts an inner bottom surface 911 of a bottom part 91 of the fuel tank 9 upon assembling the fuel pump module 1 to the fuel tank 9. The base 20 includes a base main body 21, a sender gauge 22 and a coupling shaft portion 23.

The base main body 21 is made of resin. The base main body 21 is configured such that a bottom surface 210 of the base main body 21 contacts the inner bottom surface 911 of the fuel tank 9 at the time of assembling the fuel pump module 1 to the fuel tank 9. The base main body 21 includes: a planar plate portion 211, which has the bottom surface 210; and a peripheral wall portion 212, which extends generally perpendicular to the bottom surface 210 from the planar plate portion 211 in a direction that is opposite from the bottom surface 210.

The sender gauge 22 is installed to the peripheral wall portion 212. The sender gauge 22 includes a float 221, an arm 222 and a sensor device 223.

The float 221 is made of a material that has a density, which is smaller than a density of the fuel. The float 221 floats on a surface of the fuel in the inside of the fuel tank 9.

One end of the arm 222 is connected to the float 221. The other end of the arm 222 is rotatably connected to the sensor device 223. The arm 222 is rotated about the other end of the arm 222, which serves as a rotational center of the arm 222, in response to a change in a position of the float 221, which corresponds to a change in a level of the surface of the fuel.

The sensor device 223 is fixed to the peripheral wall portion 212. The sensor device 223 senses a rotational angle of the arm 222. The sensor device 223 outputs a signal, which corresponds to the rotational angle of the arm 222, to an electronic control device (not shown) placed at the outside through a wire harness 37 and the flange 30.

The coupling shaft portion 23 is molded integrally with the peripheral wall portion 212 in one piece. The coupling shaft portion 23 (more specifically, a main body part 231 of the coupling shaft portion 23 described later) is generally perpendicular to the bottom surface 210 of the planar plate portion 211 like the peripheral wall portion 212. The coupling shaft portion 23 is configured such that the coupling shaft portion 23 is coupleable with the coupler 401. Details of the structure of the coupling shaft portion 23 will be described later.

The flange 30 is placed on an opposite side of the coupler 401, which is opposite from the base 20. The flange 30 is a resin member shaped into a generally circular plate form. The flange 30 forms a lid to be installed to an opening 90 of the fuel tank 9 at the time of assembling the fuel pump module 1 to the fuel tank 9. The flange 30 includes a set plate 31, a discharge port 32, an electric connector 33, a power supply connector 34 and a connecting portion 35.

The set plate 31 is shaped into a circular plate form. The set plate 31 is configured such that a diameter of the set plate 31 is larger than an inner diameter of the opening 90 of the fuel tank 9. With this configuration, when the fuel pump module 1 is assembled to the fuel tank 9, the opening 90 is closed by the set plate 31.

The discharge port 32 is configured such that the discharge port 32 projects from the set plate 31 to the outside of the fuel tank 9 when the set plate 31 is installed to the fuel tank 9 to close the opening 90. The discharge port 32 is connected to the supply pipe 111. The discharge port 32 discharges the fuel, the pressure of which is adjusted through the pressure regulating valve 11, to the outside of the fuel tank 9.

The electric connector 33 is configured such that the electric connector 33 projects from the set plate 31 to the outside of the fuel tank 9 when the set plate 31 is installed to close the opening 90. The electric connector 33 is electrically connected to the wire harness 37. The electric connector 33 outputs the signal, which is outputted from the sender gauge 22, to the outside of the fuel tank 9.

The power supply connector 34 is configured such that the power supply connector 34 projects from the set plate 31 to the outside of the fuel tank 9 when the set plate 31 is installed to close the opening 90. The power supply connector 34 is electrically connected to the wire harness 36. The power supply connector 34 supplies the electric power of the external electric power source (not shown) to the fuel pump 10 through the wire harness 36.

The connecting portion 35 is configured such that the connecting portion 35 projects from the set plate 31 into the inside of the fuel tank 9 when the set plate 31 is installed to close the opening 90. The connecting portion 35 is shaped into a generally tubular form and is movable integrally with the set plate 31. The connecting portion 35 is configured to receive the coupler 401 from an opening of the connecting portion 35 located on an opposite side that is opposite from the set plate 31. The connecting portion 35 includes a spring (not shown) that urges the coupler 401, which is inserted into the inside of the connecting portion 35, toward the side that is opposite from the set plate 31. Here, as shown in FIG. 3, a straight line, which extends through the center of the set plate 31 at the fuel pump module 1, is defined as a flange axis Z. The coupler 401 is moved along the flange axis Z and is inserted into the connecting portion 35.

The coupler 401 is placed between the base 20 and the flange 30. The coupler 401 includes an inserting portion 41, a complex-hole forming body 42, and a stopper piece 430. The inserting portion 41, the complex-hole forming body 42 and the stopper piece 430 are integrally molded in one piece from resin.

The inserting portion 41 is shaped into a generally rod form and is configured to be inserted into the connecting portion 35. The inserting portion 41 is formed to extend along the flange axis Z and contacts the spring of the connecting portion 35 at the inside of the connecting portion 35.

The complex-hole forming body 42 is shaped into a generally planar plate form and is located at an opposite side of the inserting portion 41, which is opposite from an inserted part of the inserting portion 41 that is inserted into the connecting portion 35. The complex-hole forming body 42 has a complex hole 420 that is engageable with the coupling shaft portion 23. When the coupling shaft portion 23 is engaged into the complex hole 420, the base 20 is rotatably supported by the coupler 401. The complex hole 420 includes an insertion hole section 421, an engaging hole section 422 and a gap section 423. Details of the complex hole 420 will be described later.

The stopper piece 430 is formed at the complex-hole forming body 42. The stopper piece 430 is placed at the insertion hole section 421 and the gap section 423 of the complex hole 420. The stopper piece 430 limits disengagement of the coupling shaft portion 23 from the complex hole 420 to limit failure of relative rotation between the base 20 and the coupler 401.

Figure 4:
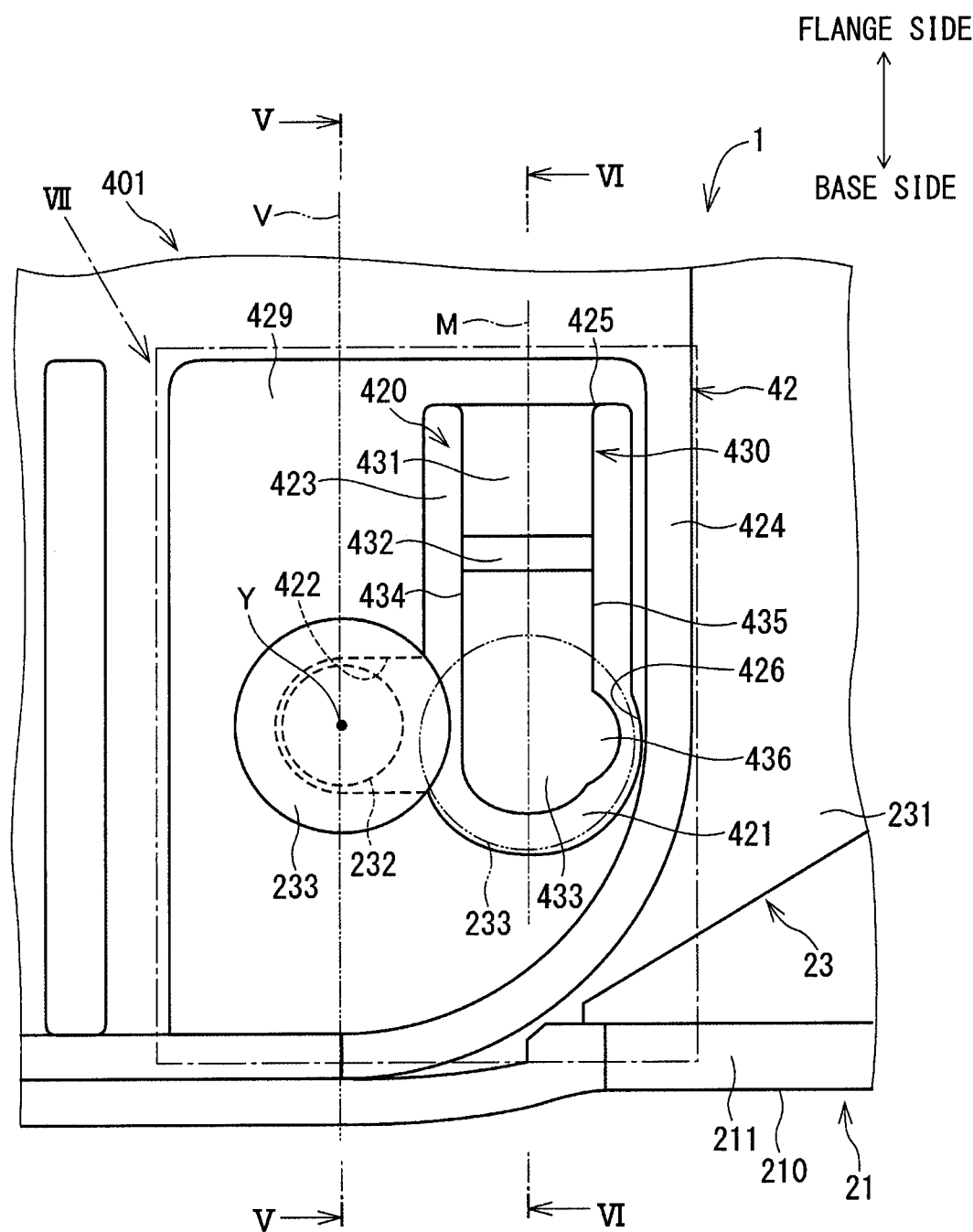
FIG. 4 is a partial enlarged view of the fuel pump module according to the first embodiment.
Figure 5:
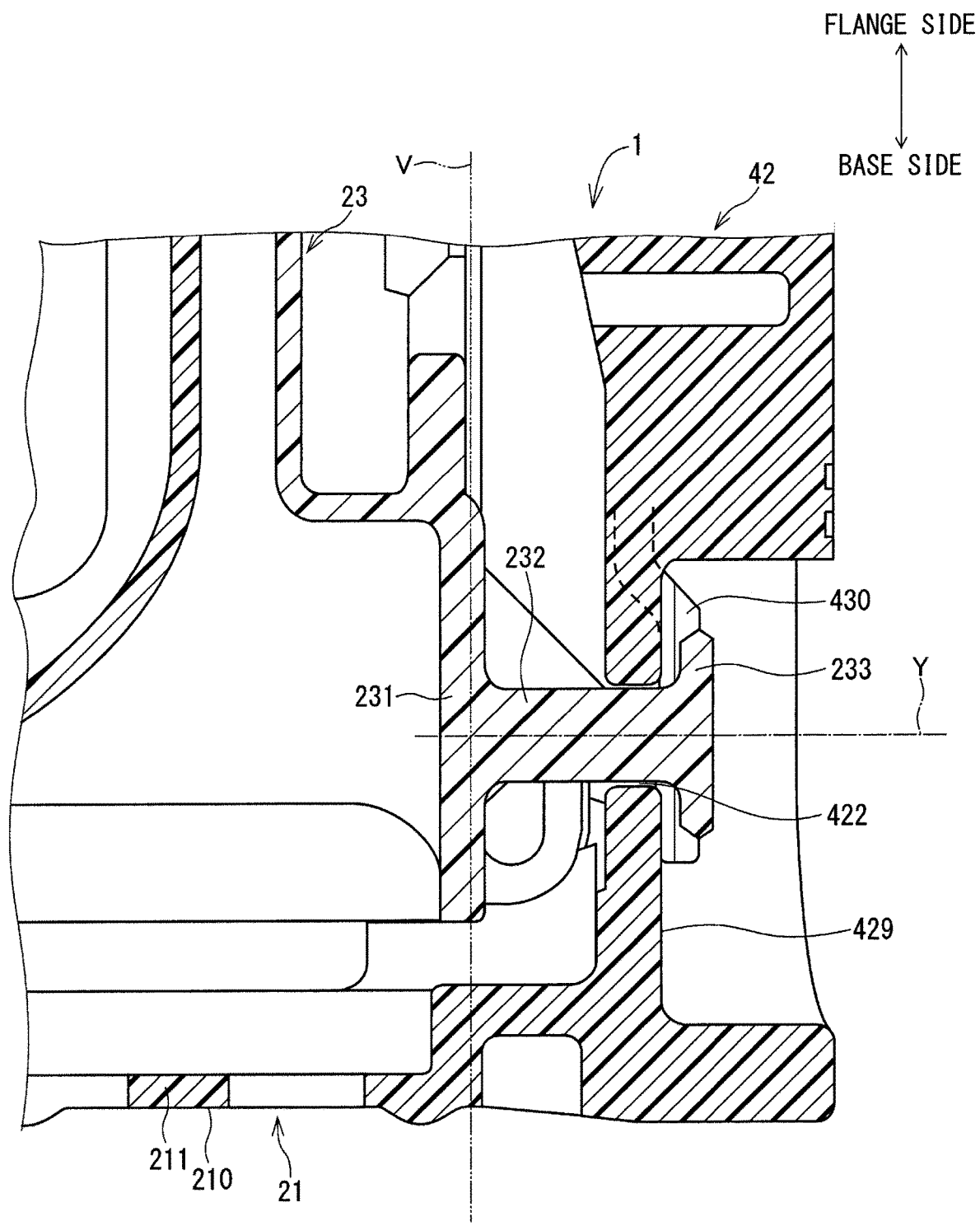
FIG. 5 is a cross-sectional view taken along line V-V in FIG. 4.
Figure 6:
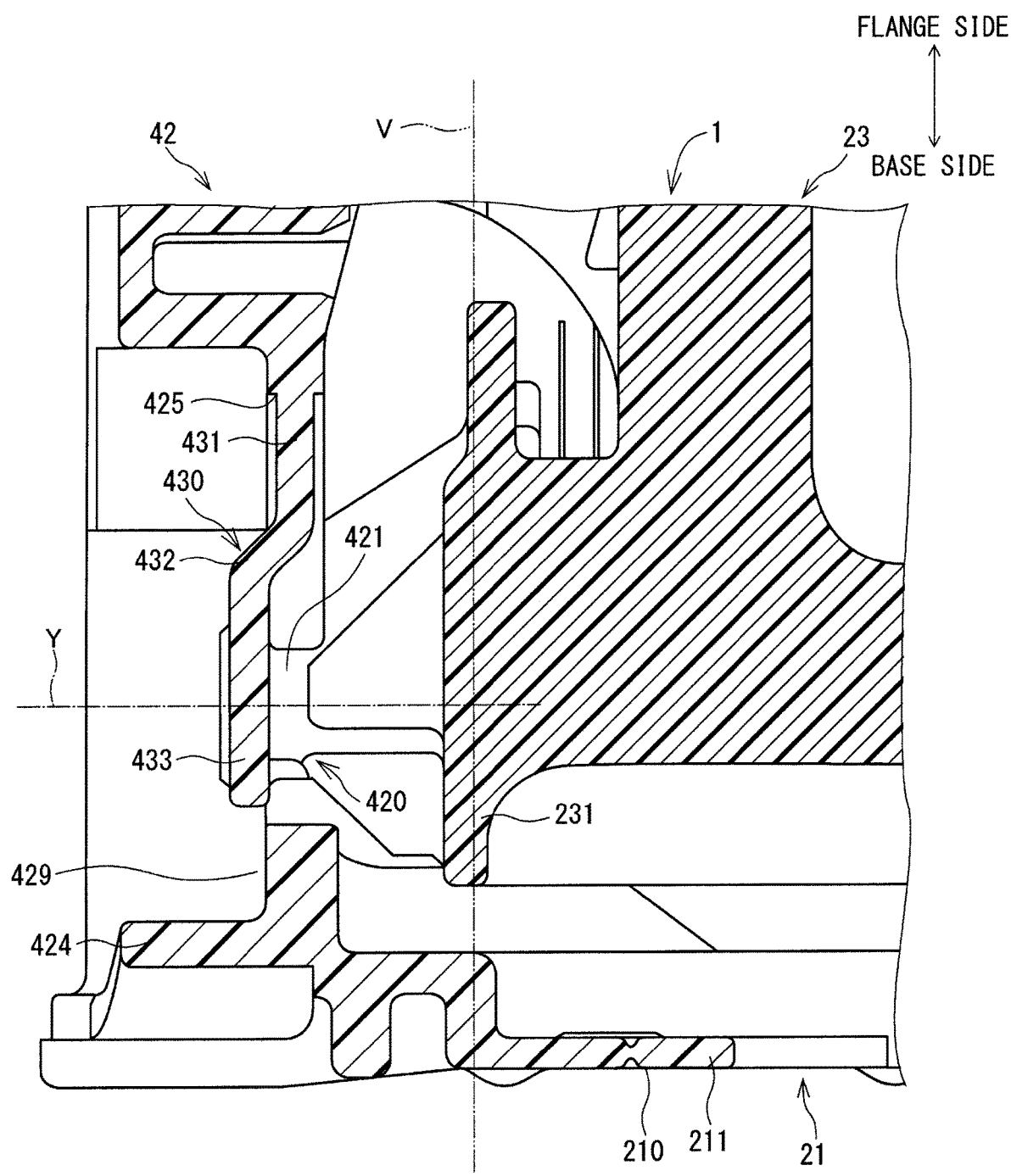
FIG. 6 is a cross-sectional view taken along line VI-VI in FIG. 4.

Here, the characteristic structures of the coupling shaft portion 23, the complex-hole forming body 42 and the stopper piece 430 will be described with reference to FIGS. 4 to 6. FIG. 4 indicates an area, at which the base 20 and the coupler 401 are connected together. In FIGS. 4 to 6, for the sake of convenience, an upper side is indicated as a flange side, and a lower side is indicated as a base side.

First of all, details of the structure of the coupling shaft portion 23 will be described. In the present embodiment, the coupling shaft portion 23 is formed at the base 20. The coupling shaft portion 23 includes the main body part 231, a small diameter part 232 and a large diameter part 233. The small diameter part 232 and the large diameter part 233 are coaxial with a central axis Y of the coupling shaft portion 23.

As shown in FIGS. 5 and 6, the main body part 231 is shaped into a generally plate form, which is generally perpendicular to the bottom surface 210 of the base main body 21. The main body part 231 extends in a direction along an imaginary line V that is perpendicular to the bottom surface 210 of the base main body 21.

The small diameter part 232 is shaped into a generally cylindrical columnar form and projects from the main body part 231 in a direction that is generally parallel to the bottom surface 210 of the base main body 21. The large diameter part 233 is shaped into a generally circular plate form and is formed at an opposite side of the small diameter part 232, which is opposite from the side of the small diameter part 232 that is connected to the main body part 231. The large diameter part 233 has an outer diameter that is larger than an outer diameter of the small diameter part 232.

In the present embodiment, the complex-hole forming body 42 is formed at the coupler 401. The complex hole 420 is formed at a bottom surface of a recess 429 of the complex-hole forming body 42. The complex hole 420 includes the insertion hole section 421, the engaging hole section 422 and the gap section 423.

The insertion hole section 421 is placed at a location that is adjacent to a wall body 424, which forms the recess 429. The insertion hole section 421 includes a space that has a size, which is larger than the outer diameter of the large diameter part 233. The insertion hole section 421 is passable for the large diameter part 233 (i.e., the large diameter part 233 is allowed to pass the insertion hole section 421). In FIG. 4, an outline of the large diameter part 233 (the outer diameter of the large diameter part 233), which passes the insertion hole section 421, is indicated by a dot-dot-dash line 233. A straight line, which extends through the center of the insertion hole section 421 and is perpendicular to the bottom surface 210 of the base main body 21 (i.e., is parallel to the imaginary line V), is defined as a center line M.

The engaging hole section 422 includes a space that has a size, which is larger than the outer diameter of the small diameter part 232 and is smaller than the outer diameter of the large diameter part 233. As shown in FIG. 4, the engaging hole section 422 is placed on an opposite side of the center line M, which is opposite from the wall body 424, and the engaging hole section 422 is communicated with the insertion hole section 421. The center line M crosses a communicating direction, in which the insertion hole section 421 and the engaging hole section 422 are communicated with each other. In the case of the example shown in FIG. 4, the center line M crosses the communicating direction such that the center line M is generally perpendicular to the communicating direction.

The gap section 423 is placed on the flange side of the insertion hole section 421 and is formed to provide a gap at each of two opposite lateral sides, respectively, of the stopper piece 430, which are opposite to each other in the direction perpendicular to the longitudinal direction of the stopper piece 430 (i.e., perpendicular to the center line M), in such a manner that the gap extends from a proximal end part 431 to a distal end part 433 of the stopper piece 430. The gap section 423 forms a space that enables free flex of the stopper piece 430.

The stopper piece 430 is in a form of tongue (i.e., a form of cantilever) and extends from a flange-side edge part (hereinafter simply referred to as an edge part) 425 of a peripheral edge of the complex-hole forming body 42, which forms the gap section 423, toward the base side along the center line M. The stopper piece 430 is resiliently deformable (i.e., has flexibility) in the axial direction of the central axis Y of the coupling shaft portion 23. The stopper piece 430 includes the proximal end part 431, an intermediate part 432 and the distal end part 433 while the proximal end part 431 is joined to the edge part 425.

The intermediate part 432 is formed at an opposite side of the proximal end part 431, which is opposite from the side of the proximal end part 431 that is joined to the edge part 425. As shown in FIG. 6, the intermediate part 432 is bent to tilt relative to both of the proximal end part 431 and the distal end part 433 such that the proximal end part 431 and the distal end part 433 are displaced relative to each other in the axial direction of the central axis Y of the coupling shaft portion 23.

The distal end part 433 is formed at an opposite side of the intermediate part 432, which is opposite from the side of the intermediate part 432 that is joined to the proximal end part 431. The distal end part 433 is configured to contact the small diameter part 232 when the small diameter part 232 is displaced from the engaging hole section 422 toward the insertion hole section 421. An outer wall surface 434 of the distal end part 433, which is located on the engaging hole section 422 side, is configured to be guided in a plate thickness direction of the stopper piece 430 through a tilt surface to enable reliable contact of the outer wall surface 434 against the small diameter part 232. Here, the plate thickness direction is defined as a direction that is perpendicular to a plane of the distal end part 433 (i.e., a plane of FIG. 4). Furthermore, a projection 436 is provided at (more specifically, is formed integrally with) the distal end part 433 of the stopper piece 430 at an outer wall surface 435 of the stopper piece 430, which is opposite from the outer wall surface 434 located on the engaging hole section 422 side in the direction perpendicular to the longitudinal direction of the stopper piece 430 (i.e., perpendicular to the center line M).

Next, an assembling method of the fuel pump module 1 to the fuel tank 9 will be described with reference to FIGS. 1 and 3 to 5. First of all, a worker (who assembles the fuel pump module 1 to the fuel tank 9) connects between the base 20, which supports the fuel pump 10, and the coupler 401. At this time, the worker inserts the large diameter part 233 and the small diameter part 232 of the base 20 into the insertion hole section 421, as indicated by the dot-dot-dash line in FIG. 4. The large diameter part 233, which now contacts the distal end part 433 of the stopper piece 430 in the insertion hole section 421, passes through the insertion hole section 421 while the large diameter part 233 resiliently deforms the distal end part 433 in the plate thickness direction.

From this state, the worker moves the base 20 relative to the coupler 401 such that the small diameter part 232 moves from the insertion hole section 421 to the engaging hole section 422. At this time, as shown in FIG. 5, the large diameter part 233 is located in the recess 429. Thereby, the main body part 231 and the large diameter part 233 are respectively placed on two opposite sides of the complex-hole forming body 42, which are opposite to each other while the small diameter part 232 is placed between the main body part 231 and the large diameter part 233.

Hereinafter, the state, in which the small diameter part 232 is held in place in the engaging hole section 422, will be referred to as an initial state. In the initial state, since the large diameter part 233 cannot pass the engaging hole section 422, removal of the coupling shaft portion 23 from the engaging hole section 422 is limited. In this way, the base 20 and the coupler 401 are connected relative to each other.

Next, the worker assembles the fuel pump module 1, in which the fuel pump 10, the base 20, the flange 30 and the coupler 401 are assembled together, to the fuel tank 9. Specifically, the worker inserts the fuel pump 10, which is supported by the base 20, into the inside of the fuel tank 9 through the opening 90 of the fuel tank 9. At this time, in order to insert the base 20, which has the larger size in comparison to the opening 90, into the opening 90, the worker rotates the base 20 about the small diameter part 232, which serves as a rotational center, to tilt the base 20 relative to the flange axis Z, as shown in FIG. 3. Next, the worker inserts the base 20, which is in the state shown in FIG. 3, into the inside of the fuel tank 9 through the opening 90. In FIG. 3, in order to avoid complication of the drawing, the supply pipe 111 and the wire harnesses 36, 37 are not depicted.

When the base 20, which is inserted into the fuel tank 9 through the opening 90, contacts the inner bottom surface 911 of the fuel tank 9, the base 20 is rotated about the small diameter part 232, which serves as the rotational center, such that the base 20 is positioned generally perpendicular to the flange axis Z.

When the set plate 31 is placed to close the opening 90 of the fuel tank 9 upon further insertion of the fuel pump module 1 into the fuel tank 9, the bottom surface 210 of the base main body 21 contacts the inner bottom surface 911 of the bottom part 91 of the fuel tank 9, as shown in FIG. 1. Thereafter, when the set plate 31 is assembled to the fuel tank 9, the assembling of the fuel pump module 1 to the fuel tank 9 is completed.

As discussed above, at the assembling operation for assembling the fuel pump module 1 to the fuel tank 9, it is important to appropriately rotate the base 20 relative to the coupler 401 in the inside of the fuel tank 9. When the failure of relative rotation between the coupling shaft portion 23 of the base 20 and the complex hole 420 of the coupler 401 occurs, the fuel pump module 1 may not be placed in the appropriate orientation at the inner bottom surface 911 of the fuel tank 9. Therefore, it is necessary to limit the occurrence of the failure of the relative rotation between the coupling shaft portion 23 of the base 20 and the complex hole 420 of the coupler 401.

Next, effects and advantages of the fuel pump module 1 of the first embodiment will be described in comparison to a fuel pump module of a comparative example. First of all, a structure and effects of the fuel pump module 7 of the comparative example will be described with reference to FIGS. 17 to 19.

Figure 17:
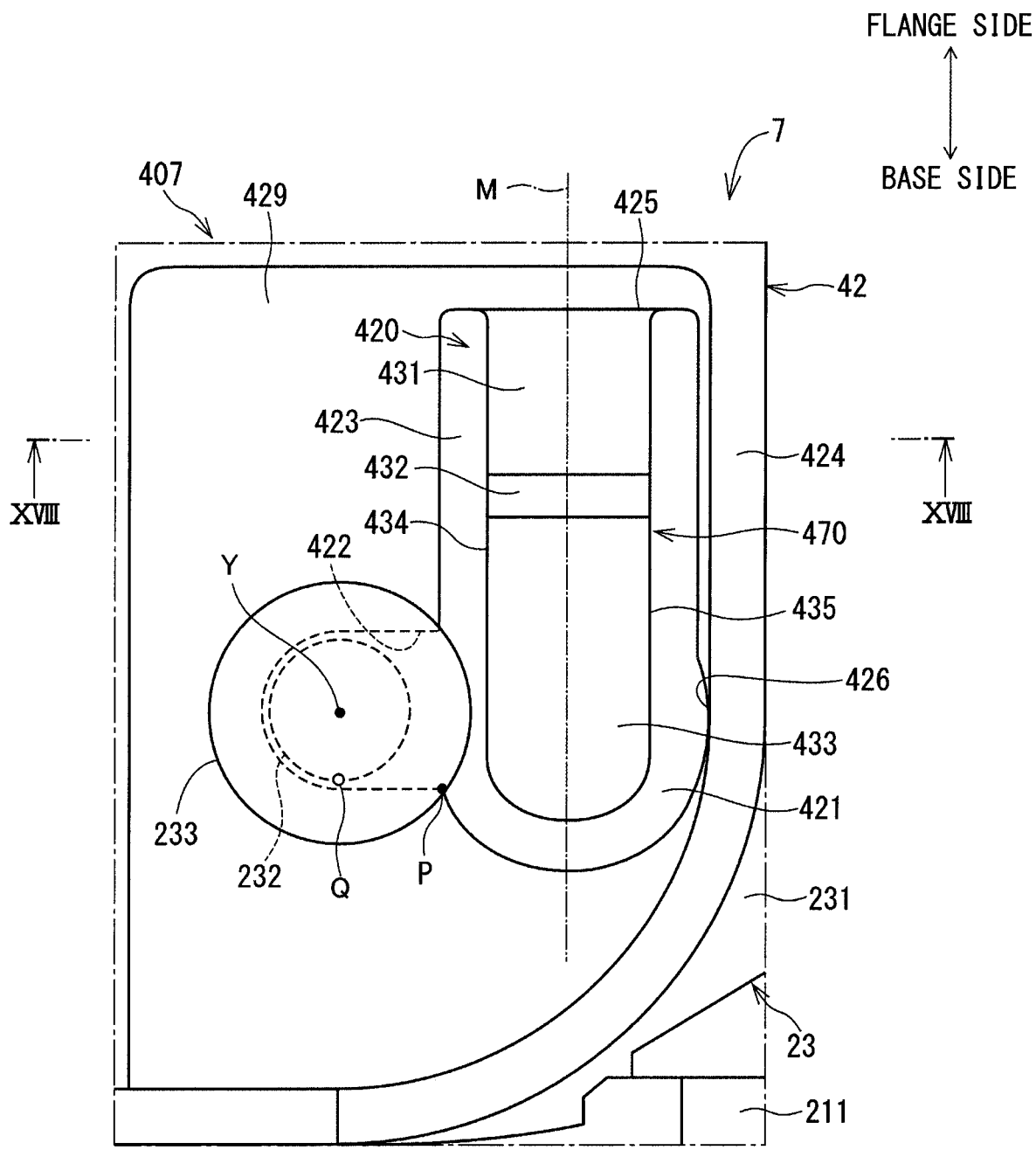
FIG. 17 is a partial enlarged view of a fuel pump module of a comparative example.

As shown in FIG. 17, in a coupler 407 of the fuel pump module 7 of the comparative example, the projection 436 of the first embodiment is not formed at the stopper piece 470. The stopper piece 470 shown in FIG. 17 corresponds to the stopper piece of JP2016-89739A. Other than the stopper piece 470, the rest of the structure of the coupler 407 is substantially the same as that of the coupler 401 of the first embodiment.

Before the time of assembling the fuel pump module 7 to the fuel tank 9, the base 20 is positioned in the state where the base 20 is generally perpendicular to the flange axis Z, as shown in FIG. 2. In this initial state, as shown in FIG. 17 that is a view taken in the axial direction of the coupling shaft portion 23, the small diameter part 232 is held in place in the engaging hole section 422, and the coupling shaft portion 23 and the complex-hole forming body 42 are placed in a state where the coupling shaft portion 23 and the complex-hole forming body 42 are rotatable relative to each other.

In FIG. 17, an apex Q of the small diameter part 232 is defined as an apex of the small diameter part 232 that is opposed to an inner wall of the engaging hole section 422 on a distal end side (i.e., the base side) where a distal end of the stopper piece 470 is placed. In other words, in the small diameter part 232, the apex Q is farthest from the central axis Y on the distal end side (i.e., the base side) in the direction parallel to the longitudinal direction (the axial direction of the center line M) of the stopper piece 470. Furthermore, a limit point P is defined as a point of intersection (or simply referred to as the intersection) where the engaging hole section 422 and the insertion hole section 421 intersect with each other on the distal end side where the distal end of the stopper piece 470 is placed.

Furthermore, at the time of inserting the fuel pump module 7 into the inside of the fuel tank 9 through the opening 90 of the fuel tank 9, the base 20 is tilted relative to the flange axis Z, as discussed above. This may possibly cause the small diameter part 232 to move from the engaging hole section 422 to the insertion hole section 421 due to, for example, the weight of the base 20 in some cases. In view of this movement (displacement) of the small diameter part 232, a displacement amount of the apex Q of the small diameter part 232, which is required to displace the apex Q of the small diameter part 232 in the initial state to the limit point P, is defined as a limit displacement amount (corresponding to a distance between the apex Q and the limit point P).

Figure 19:
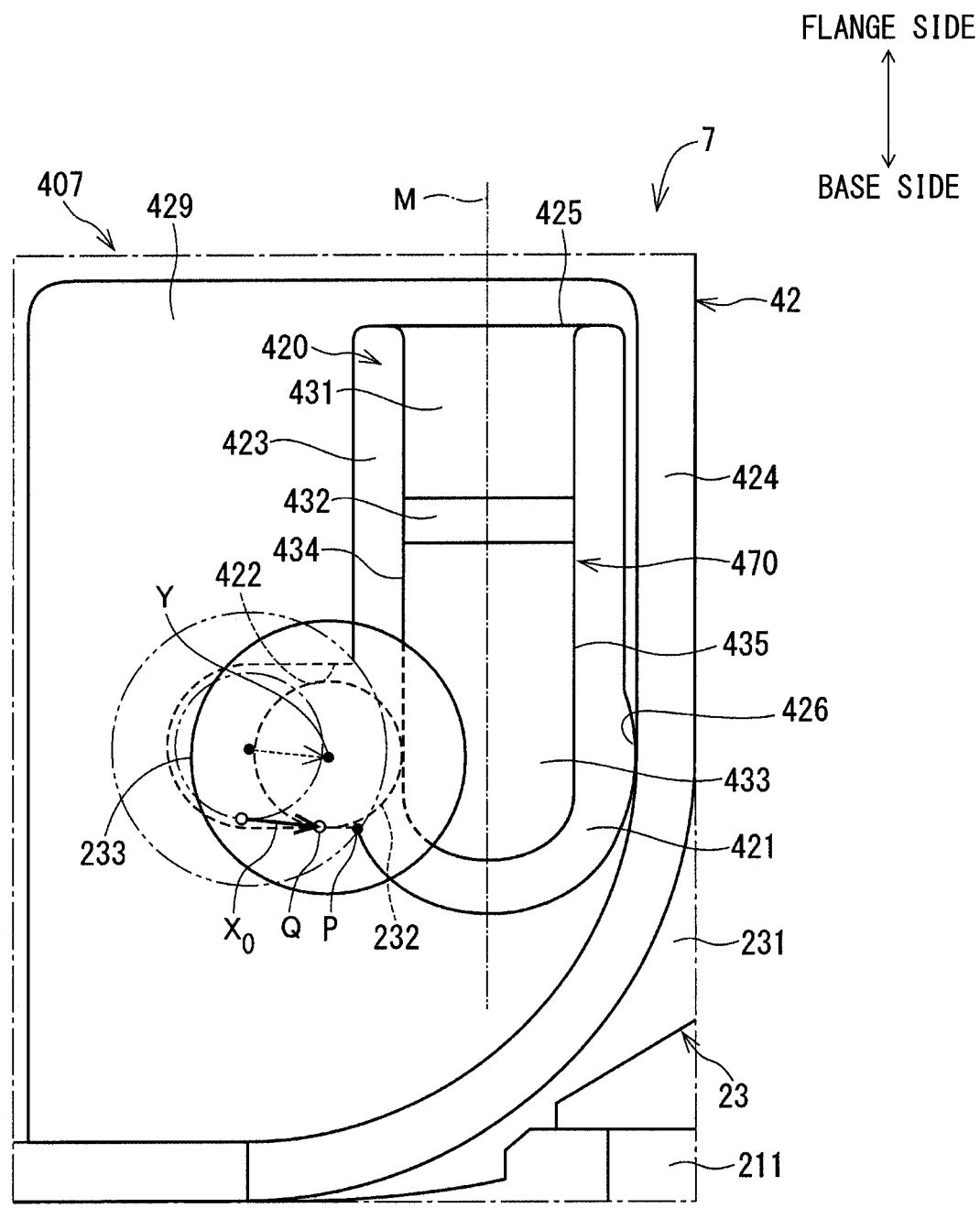
FIG. 19 is a diagram showing a state where the small diameter part contacts the stopper piece in the fuel pump module of the comparative example.
Figure 20:
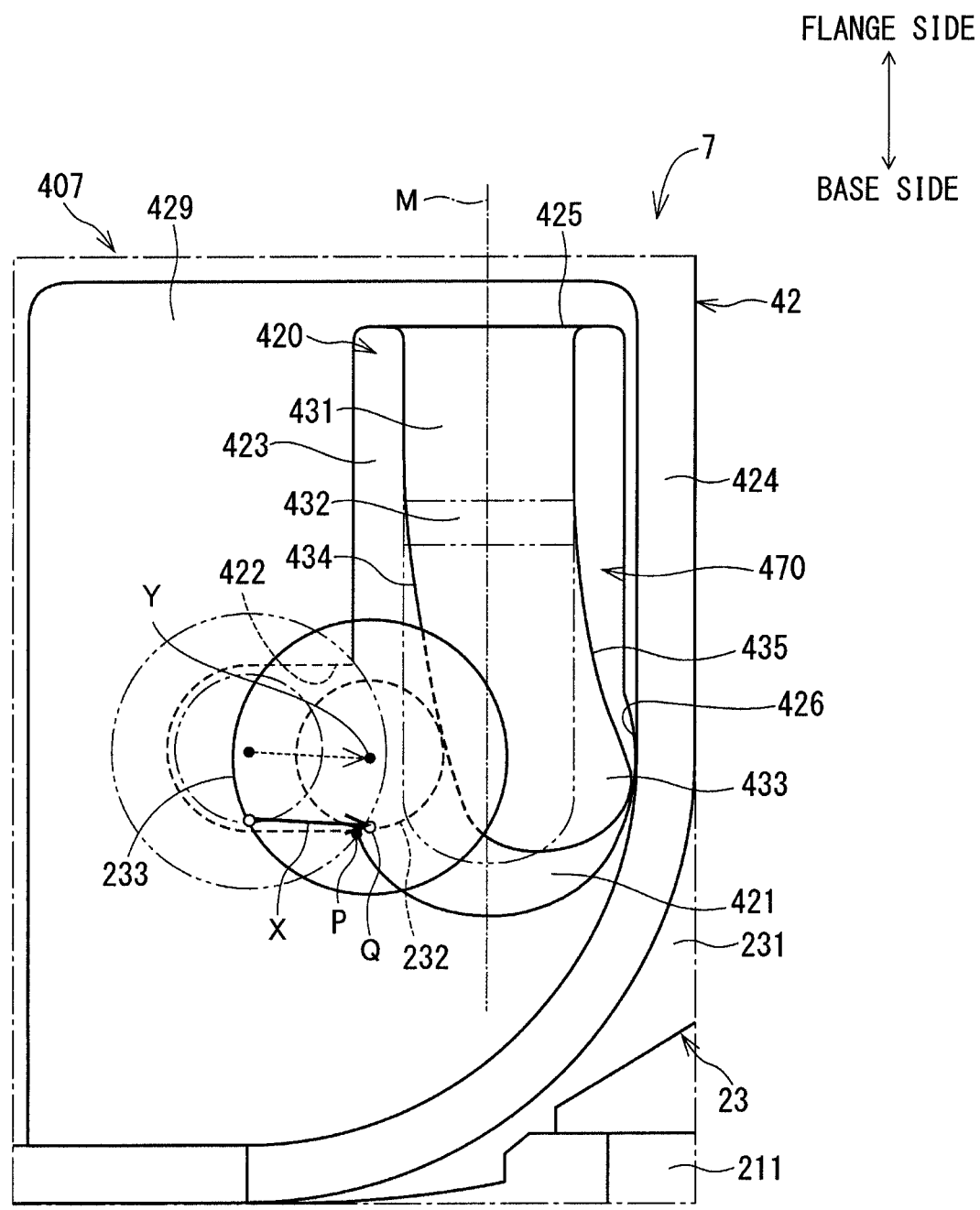
FIG. 20 is a diagram showing a state where the stopper piece is deformed in the fuel pump module of the comparative example.

FIG. 19 shows a state where the small diameter part 232 contacts the outer wall surface 434 of the distal end part 433 of the stopper piece 470 after the displacement of the small diameter part 232 from the engaging hole section 422 toward the insertion hole section 421. The displacement of the central axis Y of the coupling shaft portion 23 at this time is indicated by a dotted arrow, and the displacement of the apex Q of the small diameter part 232 is indicated by a solid arrow. Hereinafter, the displacement of the central axis Y of the coupling shaft portion 23 and the displacement of the apex Q of the small diameter part 232 will be similarly indicated in the corresponding respective drawings that are used to describe the displacement of the small diameter part 232.

If the stopper piece 470 has the sufficient rigidity against the contact load of the small diameter part 232 applied to the stopper piece 470 at the time of displacement of the small diameter part 232 and is thereby not deformed by the contact load of the small diameter part 232, the displacement of the small diameter part 232 is limited at the position of the small diameter part 232 shown in FIG. 19. At this time, the apex Q of the small diameter part 232 has not reached to the limit point P. Specifically, the displacement amount $X_0$ of the apex Q is limited to be equal to or smaller than the limit displacement amount.

However, the stopper piece 470 needs to have sufficient flexibility to enable the passing of the large diameter part 233 into the insertion hole section 421. Thus, it is practically difficult to ensure the sufficient rigidity of the stopper piece 470. Therefore, when the relatively large rotational load or a relatively large torsion load is applied at the time of inserting the fuel pump module into the fuel tank 9, the small diameter part 232, which is in contact with the outer wall surface 434, is further displaced toward the insertion hole section 421 and thereby deforms the stopper piece 470 in the opposite direction that is opposite from the small diameter part 232. Thus, the stopper piece 470 may be resiliently deformed to its maximum degree of deformation until the outer wall surface 435, which is located on the wall body 424 side, contacts the inner wall surface 426 of the insertion hole section 421.

At this time, the apex Q of the small diameter part 232 may be displaced beyond the limit point P toward the insertion hole section 421, i.e., the displacement amount X of the apex Q may become larger than the limit displacement amount. When the apex Q of the small diameter part 232 is displaced into the insertion hole section 421 beyond the limit point P, the small diameter part 232 may possibly be caught (arrested) by an edge of the limit point P. In such a case, even when the applied load is lost, the small diameter part 232 may not be returned to the engaging hole section 422. This may result in the failure of the relative rotation between the base 20 and the coupler 401, and thereby the fuel pump module 7 may not be placed in the appropriate orientation at the inner bottom surface 911 of the fuel tank 9.

Figure 18:
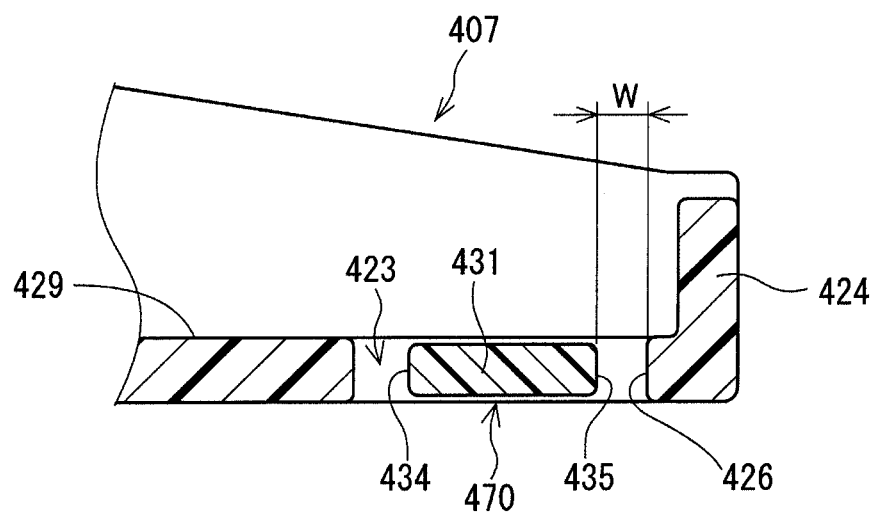
FIG. 18 is a cross-sectional view taken along line XVIII-XVIII in FIG. 17.

Here, it should be noted that as shown in FIG. 18, the proximal end part 431 of the stopper piece 470 is placed at the same height as a bottom wall of the recess 429 in a direction (a height direction) that is perpendicular to a plane of the bottom wall of the recess 429. Therefore, in a case where that the stopper piece 470 and the complex-hole forming body 42 are integrally molded with the resin, due to restrictions on strength of a mold die for molding the stopper piece 470 and the complex-hole forming body 42, it is required to provide a sufficient gap, which has a width W that is equal to or larger than a predetermined value, as the gap of the gap section 423 between the stopper piece 470 and the inner wall surface 426.

Thus, in order to limit the deformation of the stopper piece 470, it is not practical to change the width of the gap of the gap section 423 to a minute size to place the outer wall surface 435 of the stopper piece 470 adjacent to the inner wall surface 426 of the complex hole 420. As discussed above, in the fuel pump module 7 of the comparative example, it is not easy to limit the deformation of the stopper piece 470 and thereby to limit the displacement amount of the apex Q of the small diameter part 232 to a value that is equal to or smaller than the limit displacement amount.

Figure 7:
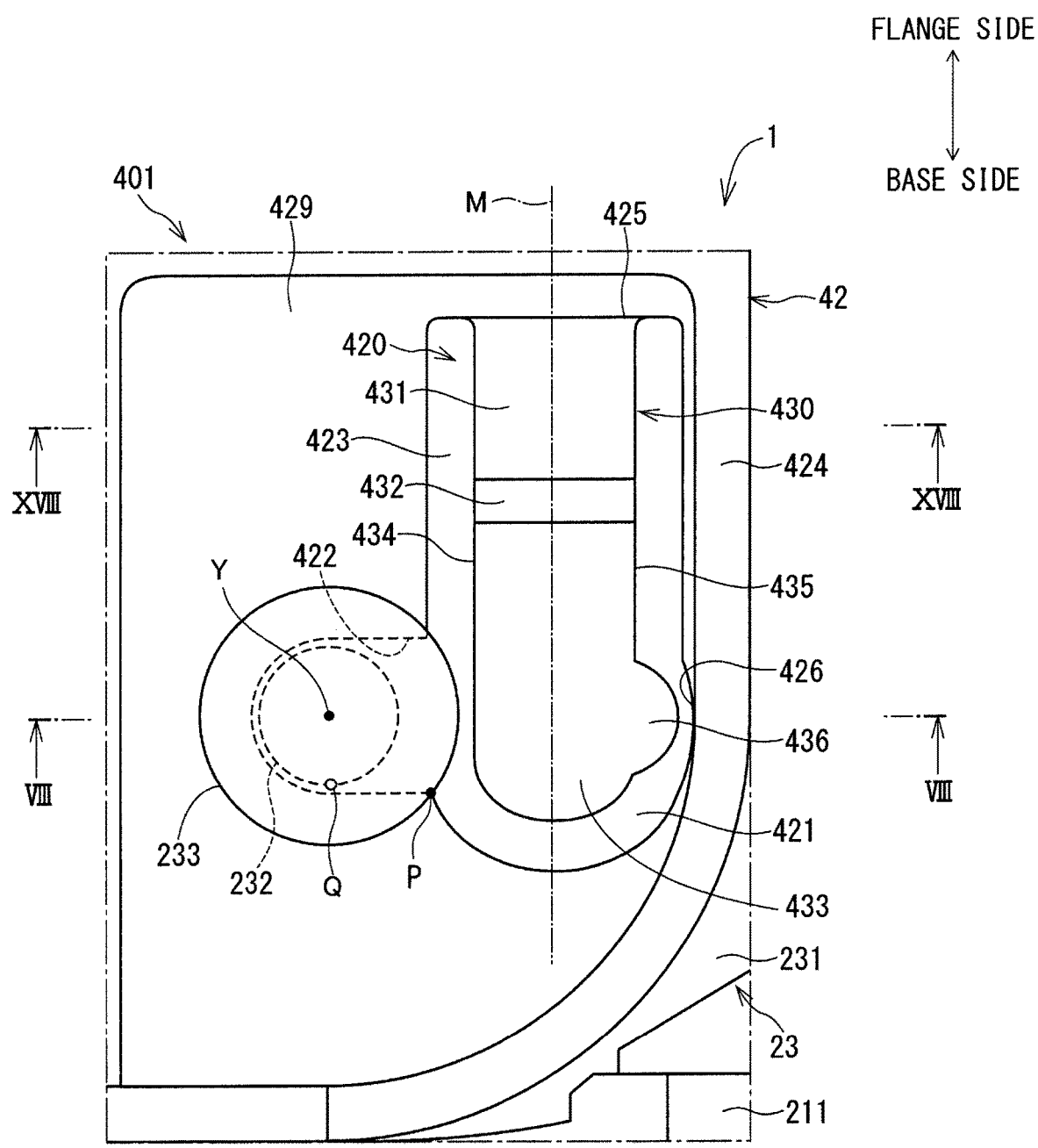
FIG. 7 is an enlarged view of an area VII in FIG. 4.
Figure 8:
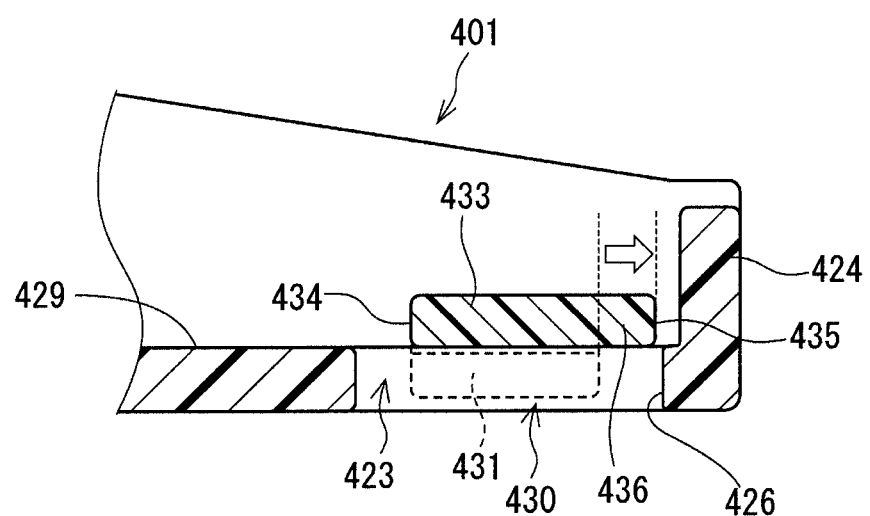
FIG. 8 is a cross-sectional view taken along line VIII-VIII in FIG. 7.
Figure 9:
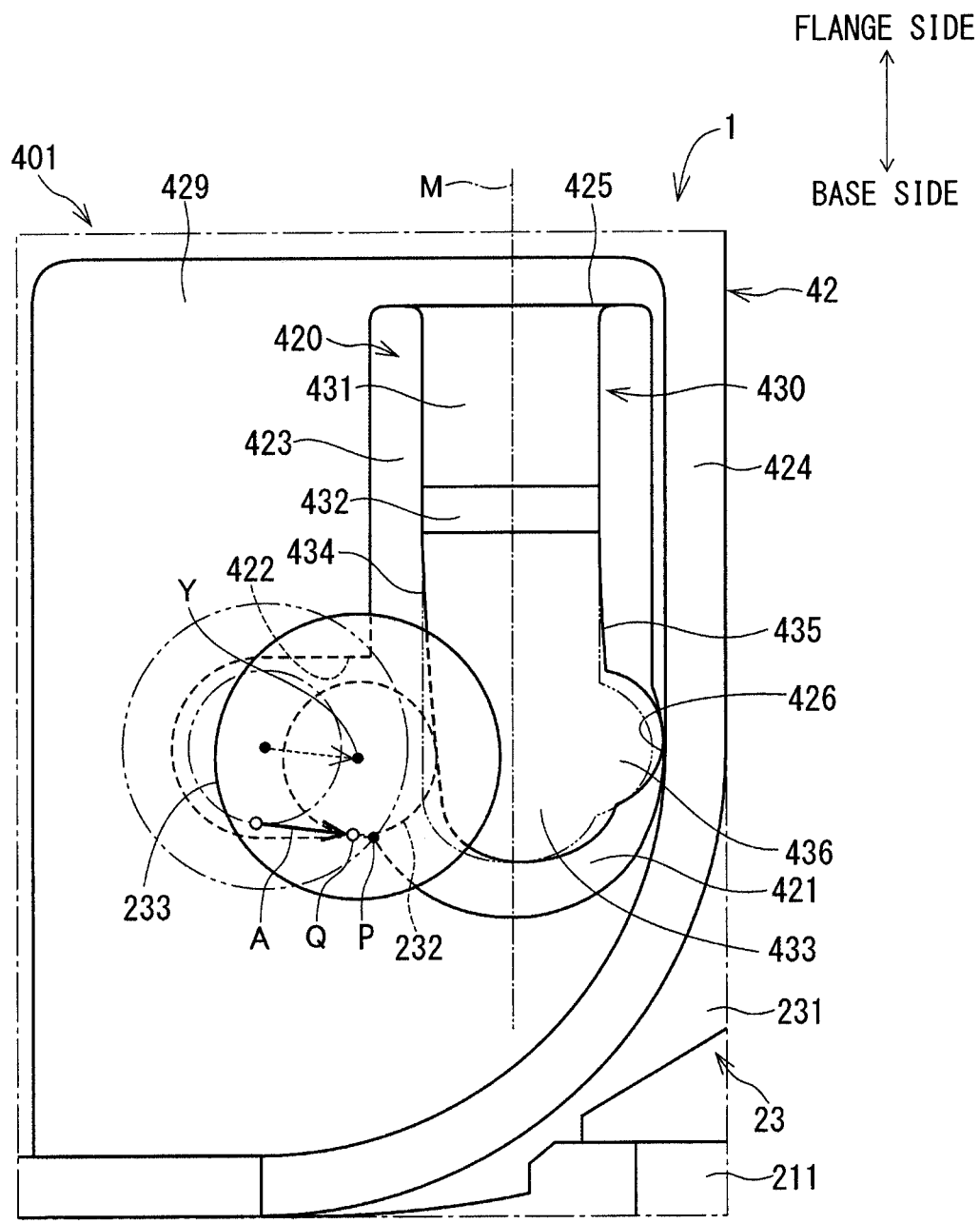
FIG. 9 is a descriptive diagram for describing limitation of a displacement amount of a small diameter part at a time of deforming the stopper piece at the fuel pump module according to the first embodiment.

Next, advantages of the fuel pump module 1 of the first embodiment will be described with reference to FIGS. 7 to 9. FIG. 7 shows the initial state. FIG. 9 is a partial enlarged view of the connection between the coupling shaft portion 23 and the complex-hole forming body 42 taken in the axial direction of the central axis Y of the coupling shaft portion 23 at the time of deforming the stopper piece 430. FIG. 8 is a cross-sectional view of the stopper piece 430 taken along the plate thickness direction of the stopper piece 430.

As shown in FIG. 7, in the coupler 401 of the fuel pump module 1 of the first embodiment, the projection 436 is formed at the outer wall surface 435 of the distal end part 433 of the stopper piece 430, which is located on the wall body 424 side. The projection 436 is formed at a location, which substantially coincides with a location of the central axis Y of the coupling shaft portion 23 in the axial direction of the center line M, such that the projection 436 is shaped into an arcuate form and projects from the outer wall surface 435 toward the inner wall surface 426 of the insertion hole section 421. At or around an apex of the arc of the projection 436, a distance between the projection 436 and the inner wall surface 426, which are opposed to each other, is smaller than (more specifically, the smallest in comparison to) that of any other part of the projection 436 (or any other part of the stopper piece 430).

Here, a cross section of the proximal end part 431 of the stopper piece 430, which is taken along the direction that is perpendicular to the center line M, is the same as that of FIG. 18 of the comparative example, and it is required to provide the sufficient gap, which has the width W that is equal to or larger than the predetermined value, as the gap of the gap section 423. In contrast, as shown in FIG. 8, the position of the distal end part 433 is upwardly deviated from the position of the bottom wall of the recess 429 in the height direction that is perpendicular to the plane of the bottom wall of the recess 429. Therefore, in the case where the stopper piece 430 is molded from the resin integrally in one piece with the complex-hole forming body 42, the location of the outer wall surface 435 can be brought closer to the inner wall surface 426, as indicated by a block arrow.

As shown in FIG. 9, when the small diameter part 232 is displaced from the engaging hole section 422 toward the insertion hole section 421 and contacts the outer wall surface 434 of the distal end part 433 of the stopper piece 430 through the application of the load exerted at the time of inserting the fuel pump module 1 into the fuel tank 9, the stopper piece 430 is deformed in the opposite direction that is opposite from the small diameter part 232. At this time, the projection 436 first contacts the opposed inner wall surface 426 prior to occurrence of contact of any other part of the stopper piece 430 to the inner wall surface 426, so that further deformation of the stopper piece 430 is limited.

Therefore, the displacement amount A of the apex Q is limited to be equal to or smaller than the limit displacement amount to limit the displacement of the apex Q beyond the limit point P toward the insertion hole section 421. Thus, the displacement amount A of the first embodiment becomes smaller than the displacement amount X of the comparative example. As discussed above, the projection 436 of the first embodiment serves as the displacement-amount limiting portion that limits the displacement amount of the apex Q of the small diameter part 232 to the amount, which is equal to or smaller than the limit displacement amount.

<Advantages>

The fuel pump module 1 of the first embodiment has the projection 436, which serves as the displacement-amount limiting portion, at the outer wall surface 435 of the stopper piece 430. Thereby, it is possible to limit the displacement of the apex Q of the small diameter part 232 beyond the limit point P toward the insertion hole section 421 even when the stopper piece 430 is deformed in the opposite direction that is opposite from the small diameter part 232 through the application of the contact load of the small diameter part 232 to the stopper piece 430.

Thus, even in a case where the stopper piece 430 is deformed through the application of the relatively large load or the relatively large torsion load to the stopper piece 430 at the time of inserting the fuel pump module 1 into the fuel tank 9, the small diameter part 232 is less likely displaced from the engaging hole section 422 to the insertion hole section 421 side to possible cause arresting of the small diameter part 232 by the wall of the complex hole 420. Therefore, when the applied load is lost, the small diameter part 232 can be appropriately returned to the position of the small diameter part 232 in the initial state. Thus, the occurrence of the failure of relative rotation between the base 20 and the coupler 401 is limited, and thereby the fuel pump module 1 can be placed in the appropriate orientation at the inner bottom surface 911 of the fuel tank 9.

In the first embodiment, the projection 436, which serves as the displacement-amount limiting portion, is formed integrally in one piece with the stopper piece 430. An increase in the number of the components and an increase in the number of assembling steps can be avoided by molding the projection 436 integrally with the stopper piece 430 from the resin. Furthermore, since the flexibility of the stopper piece 430 is not deteriorated, the operation of inserting the large diameter part 233 into the insertion hole section 421 can be appropriately performed.

Second Embodiment

Next, a fuel pump module according to a second embodiment will be described with reference to FIGS. 10 to 12.

Figure 10:
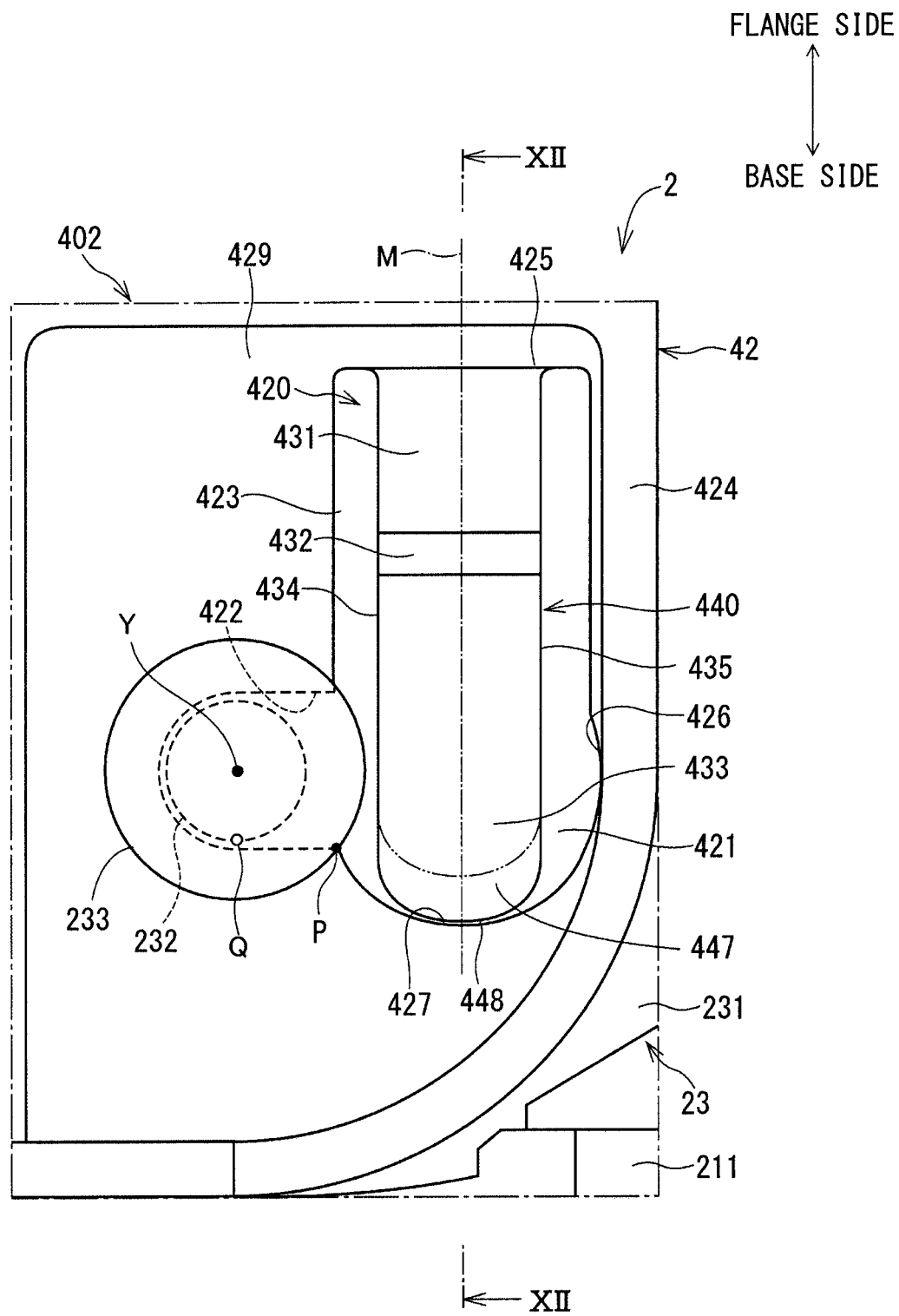
FIG. 10 is a partial enlarged view of a fuel pump module according to a second embodiment.

FIG. 10 shows the initial state. FIG. 11 is a partial enlarged view taken in the axial direction of the central axis Y of the coupling shaft portion 23 at the time of deforming the stopper piece 440. FIG. 12 is a cross-sectional view of the stopper piece 440 taken along the center line M. In the coupler 402 of the fuel pump module 2 of the second embodiment, an extending part 447, which extends distally from the distal end part 433 of the stopper piece 440 in the longitudinal direction of the stopper piece 440, is formed as the displacement-amount limiting portion. In FIG. 10, a boundary between the distal end part 433 and the extending part 447 is indicated by a dot-dot-dash line.

The stopper piece 440 of the second embodiment differs from the stopper piece 430 of the first embodiment with respect to that the projection 436 is eliminated from the stopper piece 430, and the extending part 447 is formed in place of the projection 436. Besides the above point, the basic structure of the stopper piece 440 of the second embodiment is the same as that of the stopper piece 430 of the first embodiment. Specifically, the stopper piece 440 is formed integrally in one piece with the complex-hole forming body 42 from the resin material that is resiliently deformable. Furthermore, the stopper piece 440 is in the form of tongue (i.e., the form of cantilever) and extends from the edge part 425 of the complex-hole forming body 42 in the crossing direction that crosses the communicating direction, in which the insertion hole section 421 and the engaging hole section 422 are communicated with each other.

The stopper piece 440 includes the proximal end part 431, the intermediate part 432 and the distal end part 433. The stopper piece 440 further includes the extending part 447 that distally extends from the distal end part 433. That is, the length of the stopper piece 440 is lengthened by the length of the extending part 447 in comparison to the stopper piece 470 of the comparative example. A distance between the extending part 447 and an inner wall surface 427 of the insertion hole section 421, which are opposed to each other, is smaller than (more specifically, the smallest in comparison to) a distance between any other part of the stopper piece 440 and the inner wall surface of the insertion hole section 421.

Figure 12:
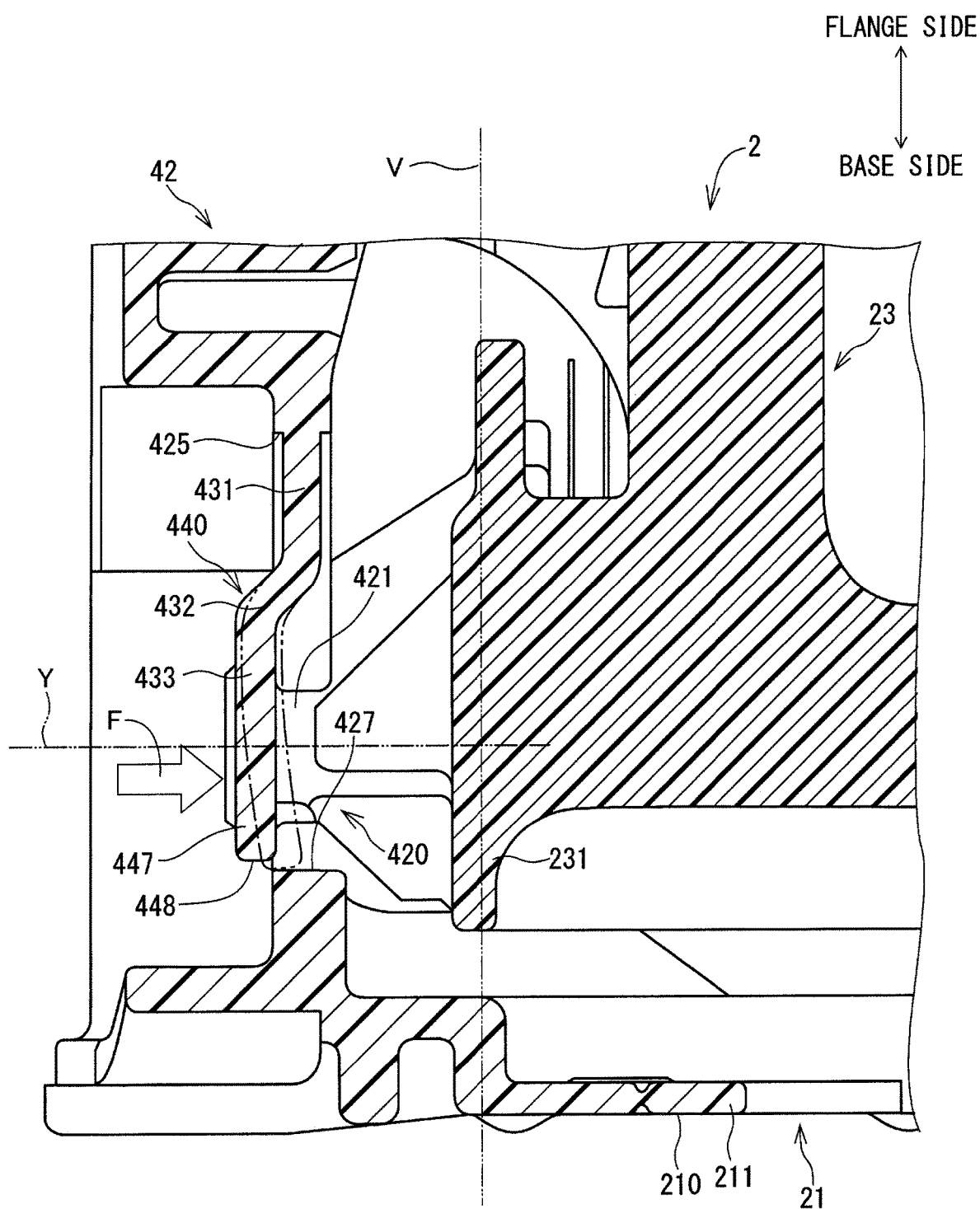
FIG. 12 is a cross-sectional view taken along line XII-XII in FIGS. 10 and 11.

As shown in FIG. 12, in the initial state, the extending part 447 of the stopper piece 440 is displaced from the inner wall surface 427 of the complex hole 420 in the axial direction of the central axis Y of the coupling shaft portion 23, so that a distal end surface 448 of the extending part 447 is slightly spaced from the inner wall surface 427 of the insertion hole section 421, which is opposed to the distal end surface 448 of the extending part 447.

When the small diameter part 232 is displaced from the engaging hole section 422 toward the insertion hole section 421 and contacts the outer wall surface 434 of the distal end part 433 of the stopper piece 430 at the time of inserting the fuel pump module 1 into the fuel tank 9, the stopper piece 440 is deformed in the opposite direction that is opposite from the small diameter part 232. At this time, as indicated by a block arrow F in FIG. 12, the large diameter part 233, which now rides on (runs on) the distal end part 433, downwardly urges the distal end part 433 toward the main body part 231 side. Specifically, the force is applied in the direction of the block arrow F from the large diameter part 233 toward the small diameter part 232, and thereby the inclination of the intermediate part 432 relative to the imaginary line V is reduced to elongate the stopper piece 440. As a result, as indicated by a dot-dot-dash line in FIG. 12, the distal end surface 448 of the extending part 447 contacts the inner wall surface 427 of the complex hole 420, which is opposed to the distal end surface 448 of the extending part 447. Then, as shown in FIG. 11, further deformation of the stopper piece 440 in the opposite direction, which is opposite from the small diameter part 232, is limited.

Figure 11:
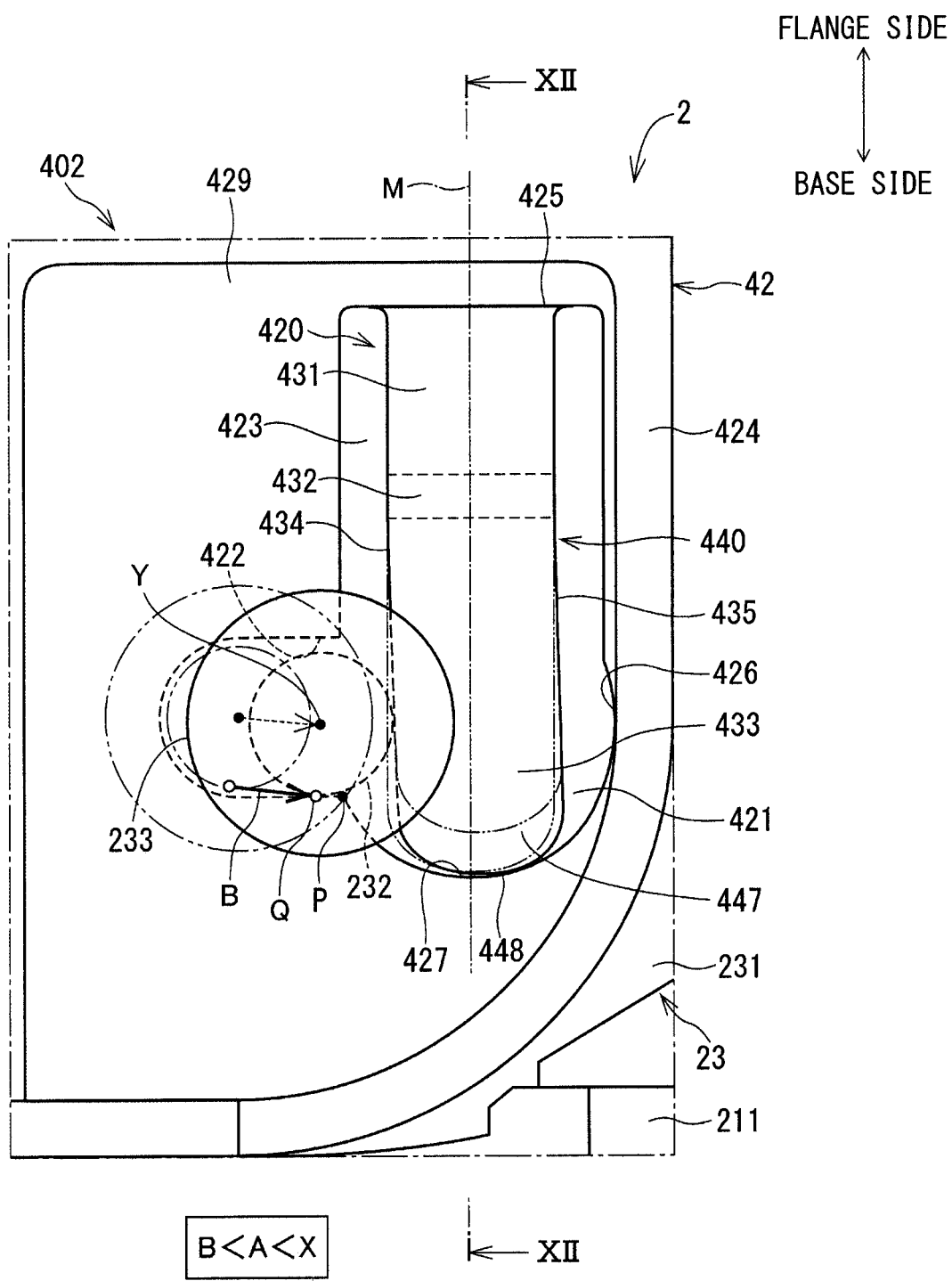
FIG. 11 is a descriptive diagram for describing limitation of a displacement amount of a small diameter part at a time of deforming a stopper piece at the fuel pump module according to the second embodiment.

FIG. 11 indicates the displacement amount B of the apex Q of the small diameter part 232. When the extending part 447 of the stopper piece 440 contacts the inner wall surface 427 of the insertion hole section 421, the displacement amount B of the apex Q is limited to be equal to or smaller than the limit displacement amount to limit the displacement of the apex Q beyond the limit point P toward the insertion hole section 421. With the structure of the extending part 447 of the second embodiment, the contact point of the stopper piece 440 against the inner wall surface of the insertion hole section 421 can be brought closer to the position of the small diameter part 232 in the initial state in comparison to the structure having the projection 436 of the first embodiment. Therefore, the displacement amount A of the second embodiment becomes smaller than the displacement amount X of the comparative example and the displacement amount A of the first embodiment. Thereby, at least the same advantages as those of the first embodiment can be achieved in the second embodiment.

In the second embodiment, like the first embodiment, the extending part 447, which serves as the displacement-amount limiting portion, is formed integrally in one piece with the stopper piece 440. An increase in the number of the components and an increase in the number of assembling steps can be avoided by molding the extending part 447 integrally with the stopper piece 440 from the resin. Furthermore, since the flexibility of the stopper piece 440 is not deteriorated, the operation of inserting the large diameter part 233 into the insertion hole section 421 can be appropriately performed.

Third Embodiment

Figure 13:
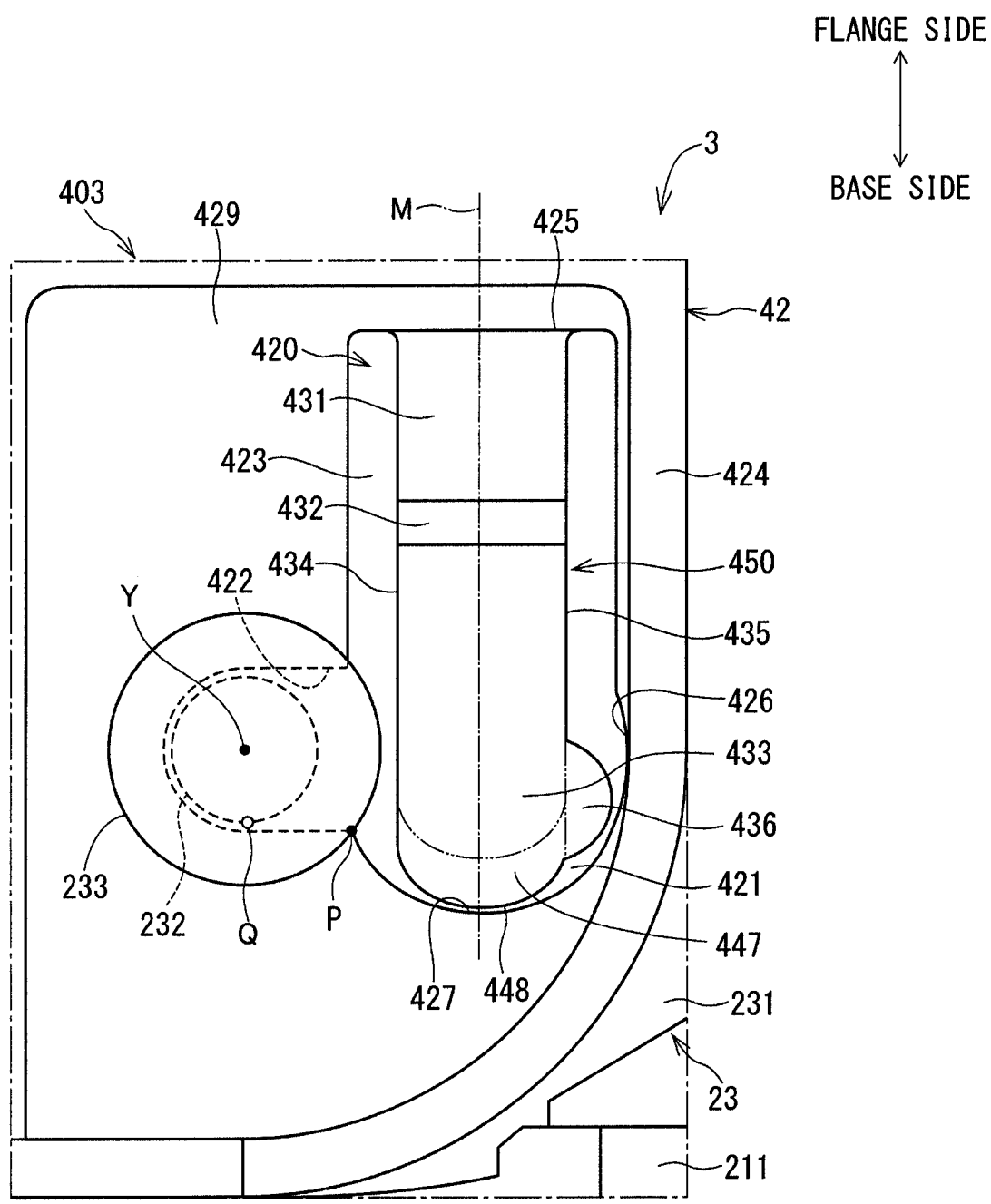
FIG. 13 is a partial enlarged view of a fuel pump module according to a third embodiment.
Figure 14:
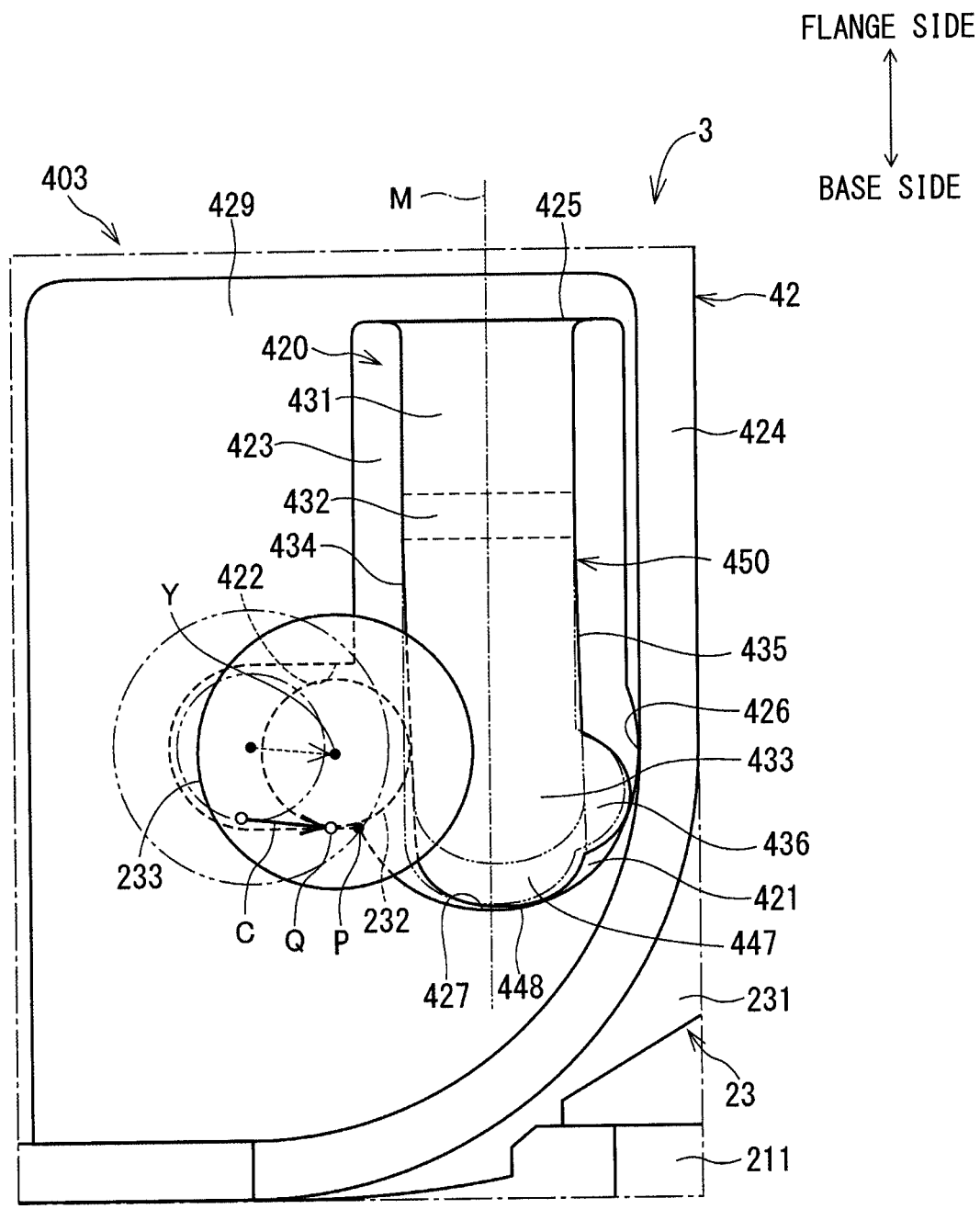
FIG. 14 is a descriptive diagram for describing limitation of a displacement amount of a small diameter part at a time of deforming a stopper piece at the fuel pump module according to the third embodiment.

Next, a fuel pump module according to a third embodiment will be described with reference to FIGS. 13 and 14. FIG. 13 shows the initial state. FIG. 14 is a partial enlarged view taken in the axial direction of the central axis Y of the coupling shaft portion 23 at the time of deforming the stopper piece 450. At the coupler 403 of the fuel pump module 3 according to the third embodiment, the projection 436 of the first embodiment and the extending part 447 of the second embodiment are formed in combination as the displacement-amount limiting portions in the stopper piece 450.

When the small diameter part 232 is displaced from the engaging hole section 422 toward the insertion hole section 421 and contacts the outer wall surface 434 of the distal end part 433 of the stopper piece 450 at the time of inserting the fuel pump module 1 into the fuel tank 9, the stopper piece 450 is deformed in the opposite direction that is opposite from the small diameter part 232. Then, the distal end surface 448 of the extending part 447 contacts the inner wall surface 427 of the complex hole 420, and the projection 436 contacts the inner wall surface 426 of the complex hole 420. Thereby, the deformation of the stopper piece 450 in the opposite direction, which is opposite from the small diameter part 232, is limited.

FIG. 14 indicates the displacement amount C of the apex Q of the small diameter part 232. When the extending part 447 and the projection 436 of the stopper piece 440 respectively contact the inner wall surface 427 and the inner wall surface 426 of the insertion hole section 421, the displacement amount C of the apex Q is limited to be equal to or smaller than the limit displacement amount to limit the displacement of the apex Q beyond the limit point P toward the insertion hole section 421. The displacement amount C of the third embodiment becomes smaller than the displacement amount X of the comparative example and the displacement amount A of the first embodiment and is equal to or smaller than the displacement amount B of the second embodiment. Thereby, at least the same advantages as those of the first and second embodiments can be achieved in the third embodiment.

Fourth Embodiment

Figure 15:
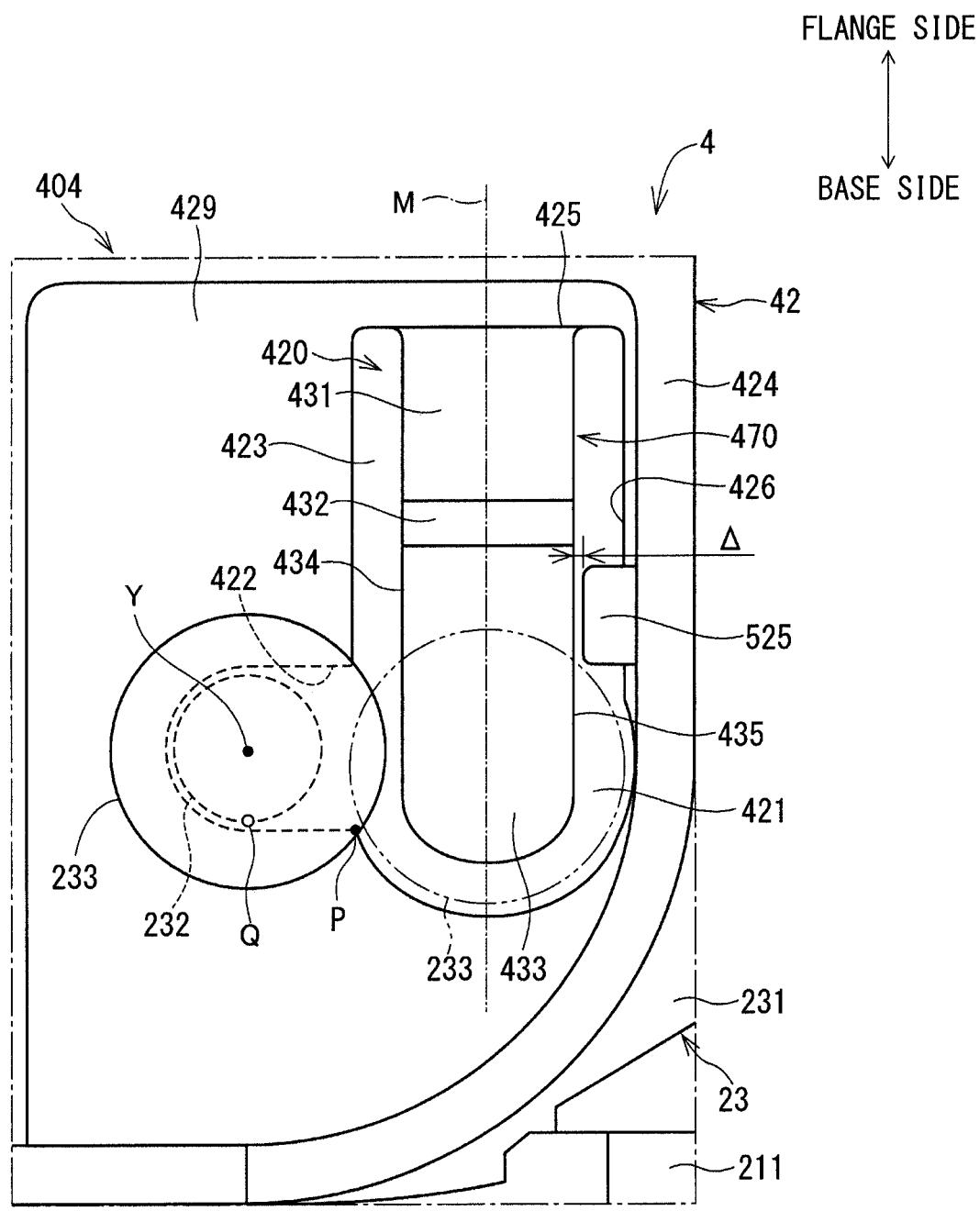
FIG. 15 is a partial enlarged view of a fuel pump module according to a fourth embodiment.

A fuel pump module according to a fourth embodiment will be described with reference to FIG. 15. At the coupler 404 of the fuel pump module 4 according to the fourth embodiment, the structure of the stopper piece 470 is substantially the same as that of the stopper piece 470 of the comparative example, so that the stopper piece 470 of the fourth embodiment does not have the projection and the extending part, each of which serves as the displacement-amount limiting portion. Instead, a projection 525, which serves as the displacement-amount limiting portion, is formed at the inner wall surface 426 of the complex hole 420.

At the inner wall surface 426 of the complex hole 420, which is located at the opposite side that is opposite from the engaging hole section 422, the projection 525 is formed at a position where the projection 525 does not interfere with the insertion hole section 421, and the projection 525 is opposed to the outer wall surface 435 of the distal end part 433 of the stopper piece 470. It is desirable that a gap Δ between the projection 525 and the outer wall surface 435, which are opposed to each other, is set to be as small as possible in view of, for example, the mold die. Specifically, the size of the gap Δ is set such that the displacement amount of the small diameter part 232 at the time of contacting the outer wall surface 435 of the stopper piece 470 against the projection 525 upon deformation of the stopper piece 470 becomes equal to or smaller than the limit displacement amount.

When the small diameter part 232 is displaced from the engaging hole section 422 toward the insertion hole section 421 and contacts the outer wall surface 434 of the distal end part 433 of the stopper piece 470 at the time of inserting the fuel pump module 1 into the fuel tank 9, the stopper piece 470 is deformed in the opposite direction that is opposite from the small diameter part 232. The outer wall surface 435 of the stopper piece 470 first contacts the projection 525 before occurrence of contact of any other part of the stopper piece 470 against the inner wall surface 426, so that the displacement amount of the small diameter part 232 is limited to be equal to or smaller than the limit displacement amount. Thereby, the fourth embodiment can achieve the same advantages as those of the first to third embodiments.

Fifth Embodiment

Figure 16:
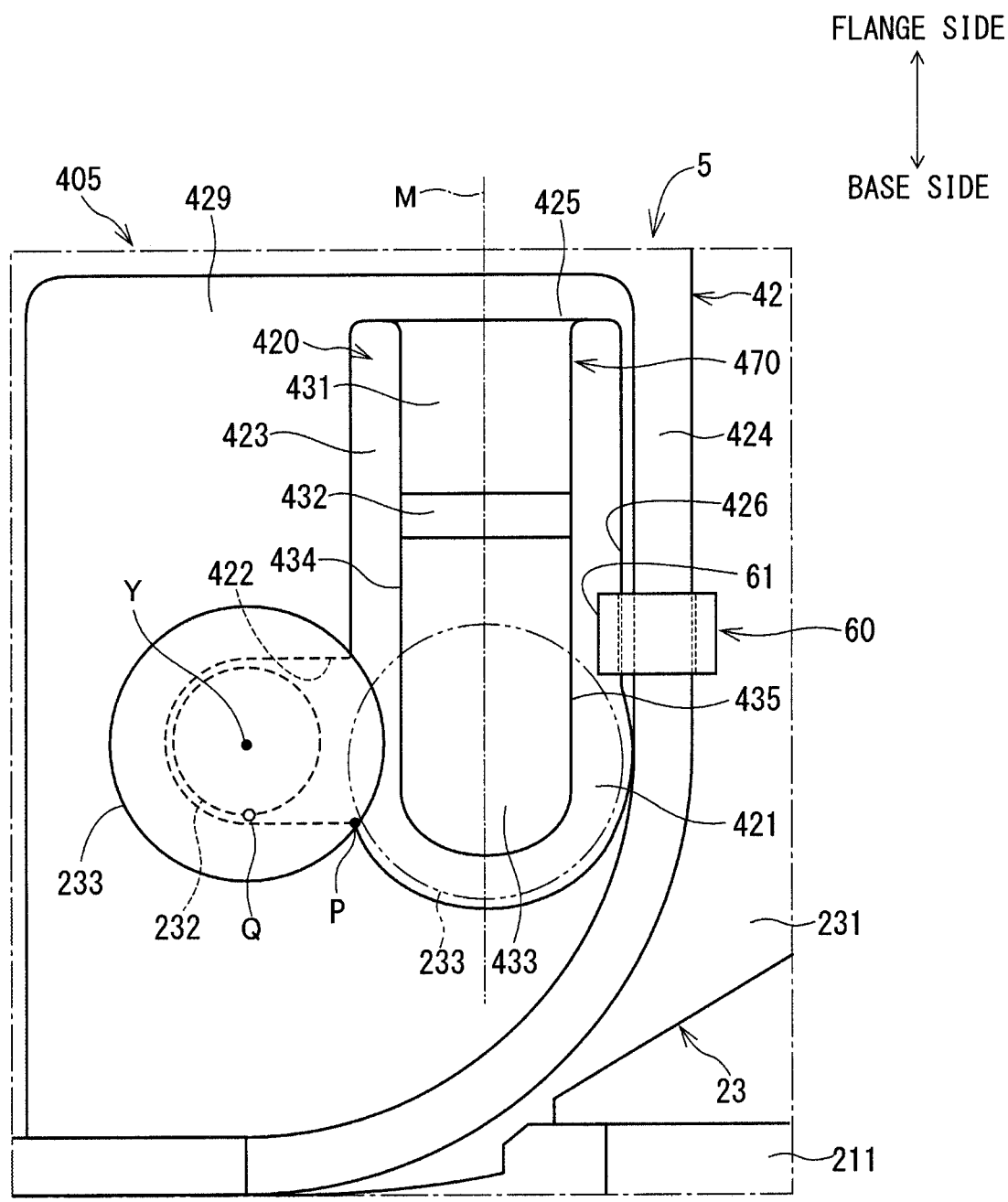
FIG. 16 is a partial enlarged view of a fuel pump module according to a fifth embodiment.

A fuel pump module according to a fifth embodiment will be described with reference to FIG. 16. At the coupler 405 of the fuel pump module 5 according to the fifth embodiment, unlike the fourth embodiment, a projection 60, which serves as the displacement-amount limiting portion, is formed as a separate member that is formed separately from the complex-hole forming body 42.

Similar to the projection 525 of the fourth embodiment, the projection 60, which is formed separately from the inner wall surface 426 of the complex hole 420, is provided to the inner wall surface 426 at the position where the projection 60 does not interfere with the insertion hole section 421, and the projection 60 is opposed to the outer wall surface 435 of the distal end part 433 of the stopper piece 470. The projection 60, which is formed as the separate member, is formed by a member having a cross section that has, for example, a substantially C-shape. The projection 60 is installed such that the projection 60 clamps two opposed surfaces of the wall body 424.

When the small diameter part 232 is displaced from the engaging hole section 422 toward the insertion hole section 421 and contacts the outer wall surface 434 of the distal end part 433 of the stopper piece 470 at the time of inserting the fuel pump module 1 into the fuel tank 9, the stopper piece 470 is deformed in the opposite direction that is opposite from the small diameter part 232. The displacement amount of the small diameter part 232 is limited to be equal to or smaller than the limit displacement amount when the outer wall surface 435 of the stopper piece 470 contacts a side surface 61 of the projection 60 before occurrence of contact of any other part of the stopper piece 470 against the projection 60 or the inner wall surface of the complex hole 420. The fifth embodiment achieves the advantages that are the same as those of the fourth embodiment and enables addition of the function of the displacement-amount limiting portion later (i.e., enables addition of the function of the displacement-amount limiting portion to a pre-existing fuel pump module).

Other Embodiments

In the above embodiments, the coupling shaft portion 23 is provided to the base 20, and the complex-hole forming body 42 is provided to the coupler 401-405. In another embodiment, alternative to this configuration, the complex-hole forming body may be provided to the base, and the coupling shaft portion may be provided to the coupler.

The shapes of the proximal end part 431, the intermediate part 432 and the distal end part 433 of the stopper piece of each embodiment are not necessarily limited to the above described ones. For example, the intermediate part 432 may not be clearly bent between the proximal end part 431 and the distal end part 433 but may have a shape that continuously gradually changes. Furthermore, a rib may be formed at a front surface of the stopper piece, which is configured to contact the large diameter part 233 of the coupling shaft portion 23. For example, when the large diameter part 233 contacts the rib before occurrence of the contact of the small diameter part 232 against the outer wall surface 434 of the stopper piece, the displacement amount of the apex Q can be reduced. Furthermore, the rib can improve the rigidity of the stopper piece to limit the flexing of the stopper piece.

The projection 436 and/or the extending part 447 of the stopper piece 430, 440, 450 of any one of the first to third embodiments may be combined with the projection 525, 60 of the inner wall surface 426 of the complex hole 420 of the fourth or fifth embodiment. When the displacement-amount limiting portions are provided to both of the stopper piece and the complex hole, a backup (a fail-safe function) is provided to improve the reliability.

In view of the fifth embodiment where the projection 60, which is formed as the separate member, is provided to the inner wall surface 426 of the complex hole 420, the projection, which is formed at the outer wall surface 435 of the stopper piece 430, 450 in the first or third embodiment, may be formed as a separate member that is formed separately from the stopper piece and is installed to the stopper piece later. Furthermore, the shape of the cross section of the projection, which is formed as the separate member, is not necessarily limited to the substantially C-shape and may be in any other shape that is other than the substantially C-shape.

The present disclosure should not be limited to the embodiments described above, and various other embodiments may be implemented without departing from the scope of the present disclosure.

What is claimed is:

1. A fuel pump module configured to be installed in an inside of a fuel tank, comprising:
    a fuel pump that is configured to pump fuel stored in the inside of the fuel tank;
    a base that is configured to be placed at a bottom part of the fuel tank and supports the fuel pump;
    a flange that forms a lid to be installed to an opening of the fuel tank; and
    a coupler that is placed between the flange and the base and rotatably supports the base, wherein:
    the base and the coupler are coupled together through engagement of a coupling shaft portion, which is formed at one of the base and the coupler, into a complex hole of a complex-hole forming body, which is formed at the other one of the base and the coupler;
    the coupling shaft portion includes:
        a main body part;
        a small diameter part that projects from the main body part; and
        a large diameter part that is formed at an opposite side of the small diameter part, which is opposite from the main body part, wherein an outer diameter of the large diameter part is larger than an outer diameter of the small diameter part;
    the complex hole includes:
        an insertion hole section that is passable for the large diameter part; and
        an engaging hole section that is communicated with the insertion hole section, wherein the engaging hole section is passable for the small diameter part but is not passable for the large diameter part;
    the complex-hole forming body includes a stopper piece, wherein the stopper piece is in the form of a tongue and extends from an edge part of the complex-hole forming body in a crossing direction that crosses a communicating direction, in which the insertion hole section and the engaging hole section are communicated with each other, while a distal end part of the stopper piece is deformable in the insertion hole section;
    the stopper piece contacts the small diameter part and thereby limits a displacement amount of the small diameter part when the small diameter part is displaced from an initial state, in which the small diameter part is held in place in the engaging hole section, toward the insertion hole section;
    in a view taken in an axial direction of the coupling shaft portion, in the initial state, an apex of the small diameter part is opposed to an inner wall of the engaging hole section on a distal end side where a distal end of the stopper piece is placed, and a displacement amount of the apex of the small diameter part, which is required to displace the apex of the small diameter part in the initial state to a limit point, is defined as a limit displacement amount while the limit point is a point of intersection where the engaging hole section and the insertion hole section intersect with each other on the distal end side where the distal end of the stopper piece is placed; and
    at least one of the stopper piece and the complex hole has at least one displacement-amount limiting portion that limits the displacement amount of the apex of the small diameter part to an amount, which is equal to or smaller than the limit displacement amount, through contact of the at least one displacement-amount limiting portion against an opposing surface, against which the at least one displacement-amount limiting portion is opposed, before occurrence of contact of any other part of the at least one of the stopper piece and the complex hole against the opposing surface when the stopper piece is deformed in an opposite direction that is opposite from the small diameter part by a contact load of the small diameter part applied to the stopper piece.

2. The fuel pump module according to claim 1, wherein:
    the stopper piece includes a projection as the displacement-amount limiting portion while the projection is provided at an outer wall surface of the stopper piece, which is opposite from the engaging hole section; and
    the projection is configured to contact an inner wall surface of the complex hole when the stopper piece is deformed in the opposite direction that is opposite from the small diameter part.

3. The fuel pump module according to claim 1, wherein:
    the stopper piece includes an extending part as the displacement-amount limiting portion while the extending part extends distally from the distal end part of the stopper piece, and a distance between the extending part and an inner wall surface of the insertion hole section, which are opposed to each other, is smaller than a distance between any other part of the stopper piece and the inner wall surface of the insertion hole section;
    a distal end surface of the extending part is configured to contact an inner wall surface of the insertion hole section, which is opposed to the distal end surface of the extending part, when the stopper piece is deformed in the opposite direction that is opposite from the small diameter part.

4. The fuel pump module according to claim 1, wherein:
    the complex-hole forming body includes a projection as the displacement-amount limiting portion while the projection of the complex-hole forming body is provided at an inner wall surface of the complex hole, which is opposite from the engaging hole section; and
    the projection of the complex-hole forming body is configured to contact an outer wall surface of the stopper piece when the stopper piece is deformed in the opposite direction that is opposite from the small diameter part.

5. The fuel pump module according to claim 4, wherein the projection of the complex-hole forming body is formed as a separate member that is formed separately from the complex-hole forming body.

* * * * *